US008340316B2

(12) United States Patent
Kanamori

(10) Patent No.: US 8,340,316 B2
(45) Date of Patent: Dec. 25, 2012

(54) DIRECTIONAL MICROPHONE DEVICE

(75) Inventor: Takeo Kanamori, Osaka (JP)

(73) Assignee: Panasonic Corporation, Osaka (JP)

( * ) Notice: Subject to any disclaimer, the term of this patent is extended or adjusted under 35 U.S.C. 154(b) by 342 days.

(21) Appl. No.: 12/674,245

(22) PCT Filed: Aug. 21, 2008

(86) PCT No.: PCT/JP2008/002271

§ 371 (c)(1),
(2), (4) Date: Feb. 19, 2010

(87) PCT Pub. No.: WO2009/025090

PCT Pub. Date: Feb. 26, 2009

(65) Prior Publication Data

US 2011/0170705 A1 Jul. 14, 2011

(30) Foreign Application Priority Data

Aug. 22, 2007 (JP) ................................ 2007-215466

(51) Int. Cl.
*H04R 3/00* (2006.01)
*H04R 29/00* (2006.01)
*H04R 25/00* (2006.01)
*H02B 1/00* (2006.01)

(52) U.S. Cl. ............ 381/92; 381/58; 381/122; 381/123; 381/313

(58) Field of Classification Search .................... 381/92, 381/122, 119, 123, 56, 58, 313, 91, 164
See application file for complete search history.

(56) References Cited

U.S. PATENT DOCUMENTS 5,226,087 A 7/1993 Ono et al.
6,453,048 B1 9/2002 Akino
7,054,451 B2 5/2006 Janse et al.
2004/0170284 A1 9/2004 Janse et al.
2004/0185804 A1 9/2004 Kanamori et al.
2007/0242847 A1 10/2007 Gorelik et al.
(Continued)

FOREIGN PATENT DOCUMENTS

JP 4-318796 11/1992
(Continued)

OTHER PUBLICATIONS

International Search Report issued Oct. 28, 2008 in International (PCT) Application No. PCT/JP2008/002271.

*Primary Examiner* — Vivian Chin
*Assistant Examiner* — Douglas Suthers
(74) *Attorney, Agent, or Firm* — Wenderoth, Lind & Ponack, L.L.P.

(57) ABSTRACT

The directional microphone device according to the present invention solves a problem of increase in thermal noise (problem of decrease in sensitivity) that occurs at the time of directivity synthesis. The directional microphone device includes: a plurality of microphones which have directional and non-directional characteristics; a control unit which generates an output signal using signals outputted from each of the plurality of microphones; and an output unit which outputs the output signal generated by the control unit. The control unit generates the output signal such that a nearly non-directional directivity and a high sensitivity are obtained in small amplitude range of the output signal, and a directivity and a low sensitivity are obtained in large amplitude range of the output signal.

12 Claims, 18 Drawing Sheets

U.S. PATENT DOCUMENTS

2009/0175466 A1 * 7/2009 Elko et al. .................... 381/94.2

FOREIGN PATENT DOCUMENTS

| | | |
|---|---|---|
| JP | 4-322598 | 11/1992 |
| JP | 5-291877 | 11/1993 |
| JP | 6-169292 | 6/1994 |
| JP | 7-240990 | 9/1995 |
| JP | 8-191496 | 7/1996 |
| JP | 2770594 | 7/1998 |
| JP | 11-317996 | 11/1999 |
| JP | 2001-116783 | 4/2001 |
| JP | 2002-218583 | 8/2002 |
| JP | 2003-52096 | 2/2003 |
| JP | 2004-187283 | 7/2004 |
| JP | 2004-537233 | 12/2004 |
| JP | 2006-237816 | 9/2006 |
| JP | 2007-180896 | 7/2007 |
| WO | 03/010996 | 2/2003 |
| WO | 2005/115052 | 12/2005 |

* cited by examiner

Output signals from first and second microphone units 11 and 12

Output signal from signal subtraction unit 15

Output signal from frequency characteristic modification unit 16

Directional pattern of output signals from first and second microphone units 11 and 12

Directional pattern of output signal from signal subtraction unit 15

Directional pattern of output signal from frequency characteristic modification unit 16

Output signal from frequency characteristic modification unit 16 of conventional directional microphone device 10

Relationship of signal amplitude and directivity control range

Relationship of signal amplitude and directivity control range

FIG. 15D (D) = (A) - (C)

FIG. 24

| | (A) | (B) | (C) | (D) |
|---|---|---|---|---|
| Status of signal | Thermal noise | Thermal noise + non-stationary noise | Background noise (stationary noise) | Background noise + non-stationary noise |
| Relationship of $P_A$ and $P_B$ | $P_A=P_B=0$ | $P_A \neq P_B$ | $P_A=P_B=0$ | $P_A=P_B$ |

※Thermal noise level < Background noise

DIRECTIONAL MICROPHONE DEVICE

TECHNICAL FIELD

The present invention relates to directional microphone devices, and particularly to a directional microphone device which performs directivity synthesis of a sound-pressure gradient type and is widely used not only as a built-in microphone, but also as a general directional microphone.

BACKGROUND ART

There is a directional microphone device which is a sound-pressure gradient type and is widely used not only as a built-in microphone, but also as a general directional microphone. While the directivity synthesis method of the sound-pressure gradient type has an advantage that a small directional microphone device can be achieved, the method has a disadvantage that sound pressure sensitivity is decreased when signals are synthesized. In the directivity synthesis method of the sound-pressure gradient type, microphone sensitivity decreases with respect to the thermal noise level of a microphone unit and a microphone amplifier at the time of synthesis of the signals. This results in deterioration of signal to noise ratio (S/N). Particularly, when directivity synthesis of the sound-pressure gradient type is performed on output signals from plural microphone units, influences of the thermal noise cannot be ignored, which imposes low-frequency limit of frequency range having directivity and limitation in miniaturization of microphone array.

FIG. 1 is a block diagram showing a conventional directional microphone device 1.

A directional microphone device 1 includes: a first microphone unit 11; a second microphone unit 12; a signal delay unit 14 which receives an output signal from the second microphone unit 12 and delays the received signal; a signal subtraction unit 15 which subtracts the output signal provided from the signal delay unit 14 from an output signal provided from the first microphone unit 11; and a frequency characteristic modification unit 16 which receives the output signal from the signal subtraction unit 15, modifies the frequency characteristic of the received signal, and provides the resulting signal.

The operation of the conventional directional microphone device 1 structured as above is described.

The structure of the conventional directional microphone device 1 shown in FIG. 1 is a basic structure of a microphone which obtains directivity from two microphone units through sound-pressure gradient type synthesis. In FIG. 1, the first microphone unit 11 and the second microphone unit 12 are arranged with a spacing of distance d in the direction opposite to the front direction in the figure.

Let the sensitivity characteristic of the output signal from the first microphone unit 11 be ms1(ω), the sensitivity characteristic of the output signal from the second microphone unit 12 be ms2(ω), the direction of the sound source S be θ (where front is 0°), and velocity of sound be c, the sensitivity characteristic D (θ, ω) of the output signal from the signal subtraction unit 15 with respect to the sound source S can be expressed by the following Formula 1.

$$D(\theta, \omega) = ms1(\omega) - ms2(\omega) \cdot e^{-j\omega\frac{d \cdot \cos(\theta)}{c}} \cdot e^{-j\omega\tau} \quad \text{[Formula 1]}$$

Here, exp (−jωτ) indicates that signal is delayed by τ. Formula 1 represents, for example, that the output signal from the second microphone unit 12 provided to the signal subtraction unit 15 with delay τ cancels the signal of the first microphone unit 11 depending on the angle θ of the direction of the sound source S. More particularly, Formula 1 indicates that the directional microphone device 1 has directivity.

On the other hand, let the thermal noise characteristic of the output signal from the first microphone unit 11 be mn1(ω), and the thermal noise characteristic of the output signal from the second microphone unit 12 be mn2(ω), the thermal noise characteristic N(ω) of the output signal from the signal subtraction unit 15 can be expressed by the following Formula 2.

$$N(\omega) = mn1(\omega) - mn2(\omega) \cdot e^{-j\omega\tau} \quad \text{[Formula 2]}$$

Here, mn1(ω) and mn2(ω) are thermal noise of individual microphone unit; and thus, they are independent of each other. Therefore, the average power spectrum of the thermal noise signal is expressed by the following formula.

$$\overline{\{N(\omega)\}^2} \cong \overline{\{mn1(\omega)\}^2} + \overline{\{mn2(\omega)\}^2} \quad \text{[Formula 3]}$$

Thus, where the levels of mn1(ω) and mn2(ω) are equal to each other, the average spectrum of N(ω) is mn1(ω) with an approximate increase of 3 dB, that is, approximately twice of the mn1(ω).

Hereinafter, calculation results of the above formulas where the microphone unit spacing d that is a distance between the first microphone unit 11 and the second microphone unit is 10 mm, are shown.

FIG. 2A to FIG. 2C are diagrams showing sound pressure frequency characteristic of each processing block of the conventional directional microphone device 1. FIG. 2A is a diagram showing sensitivity characteristic in the front direction and thermal noise spectrum in the first microphone unit 11 and the second microphone unit 12. FIG. 2B is a diagram showing sensitivity characteristic in the front direction and thermal noise spectrum in the signal subtraction unit 15. FIG. 2C is a diagram showing sensitivity characteristic in the front direction and thermal noise spectrum in the frequency characteristic modification unit 16.

FIG. 3A to FIG. 3C are diagrams showing directional pattern of each processing block of the conventional directional microphone device 1. FIG. 3A is a directional pattern in the first microphone unit 11 and the second microphone unit 12. FIG. 3B is a directional pattern in the signal subtraction unit 15. FIG. 3C is a directional pattern in the frequency characteristic modification unit 16.

Based on the calculation result of Formula 1, the sensitivity characteristic in the front direction in the output signal of the signal subtraction unit 15 is indicated by solid line in FIG. 2B. More specifically, the sensitivity decreases at lower frequency range of longer wavelength, which makes the gradient 6 dB/oct.

On the other hand, based on the calculation results of Formula 2 and Formula 3 which represent thermal noise from the first microphone unit 11 and the second microphone unit 12, the thermal noise in the output signal of the signal subtraction unit 15 is indicated by dashed line in FIG. 2B. More specifically, the thermal noise increases by 3 dB in the calculation result of the signal subtraction unit 15.

Further, due to the relationship between the arrangement of the first microphone unit 11 and the second microphone unit 12 and wavelength of the sound wave, the output signal from the signal subtraction unit 15 has a sound pressure frequency characteristic which decreases with a gradient of 6 dB/oct at lower frequency range. Thus, the frequency characteristic modification unit 16 amplifies low frequency range by 6 dB/oct gradient so as to flatten the sound pressure sensitivity in the front direction as shown in FIG. 2C.

As a result, the thermal noise level of the directional output signal from the frequency characteristic modification unit 16 increases, for example, by approximately 30 dB at low frequency (100 Hz), for the front sensitivity of the same wavelength (see FIG. 2A and FIG. 2C which show sound pressure frequency characteristics).

Further, as shown in FIG. 3A, the output signals of the first microphone unit 11 and the second microphone unit 12 have non-directional directivity, whereas, as shown in FIG. 3B and FIG. 3C, the output signal of the directional microphone device 1 has a unidirectional pattern (where $\tau=d/c$).

In general, the S/N of a widely used electret condenser microphone (ECM) is approximately ranging from 58 to 60 dB (where reference sound pressure level is 94 dBspl (1 kHz)). It is the level at which the thermal noise of the ECM is slightly greater than background noise and which can be auditorily perceived, in a quiet environment of noise level at 30 dB(A) approximately. However, for example, in the case where two microphone units are used for the small directional microphone device 1 with the spacing d of approximately 10 mm between the microphone units, the thermal noise level, as described earlier, increases by 30 dB (at 100 Hz) due to directivity synthesis. As a result, small sound is buried in the thermal noise, thereby not being perceived (sensitivity is decreased). This causes practical issues.

As seen in FIG. 2C, the increase in the thermal noise level becomes larger at lower frequency in principle. Thus, there is another proposed conventional microphone device which has a non-directional directivity and high sensitivity at low frequency and has a directivity only at high frequency (see patent reference 1).

FIG. 4 is a block diagram showing a structure of a conventional directional microphone device 10.

In FIG. 4, the directional microphone device 10 described in patent reference 1 includes: a first microphone unit 11; a high pass filter 13 which receives an output signal from a second microphone unit 11 and is a unit for passing only high frequencies in the received signal; a signal delay unit 14 which receives the output signal from the second microphone unit 12 and delays the received signal; a signal subtraction unit 15 which subtracts the output signal from the signal delay unit 14 from the output signal from the high pass filter 13; and a frequency characteristic modification unit 16 which receives the output signal from the signal subtraction unit 15 and modifies the frequency characteristic of the received signal. Here, the output signal from the directional microphone device 10 is the output signal from the frequency characteristic modification unit 16.

Hereinafter, the operation of the directional microphone device 10 is described.

The conventional directional microphone device 10 shown in FIG. 4 addresses the problem that is decrease in sensitivity at low frequency in the basic structure of the microphone which obtains directivity from two microphone units through sound-pressure gradient type synthesis. The conventional directional microphone device 10 differs from the conventional directional microphone device 1 shown in FIG. 1 in that the high pass filter 13 is provided in the latter stage of the first microphone unit 11. Other structure is the same as that of the conventional directional microphone device 1. Note that in the following description, a case where the first microphone unit 11 and the second microphone unit 12 have non-directional directivity is described.

For high frequency that is a passband of the high pass filter 13, the directional microphone device 10 in FIG. 4 has a structure identical to that of the conventional directional microphone device 1, thereby providing an output signal having directivity. On the other hand, for low frequency that is a stopband of the high pass filter 13, signal is attenuated by the high pass filter 13. More specifically, as the operation of the directional microphone device 10, among the first microphone unit 11 and the second microphone unit 12, only the output signal from the second microphone unit 12 is provided as an output signal. This results in the directional microphone device 10 that has, for low frequencies, non-directional directivity of the second microphone unit 12, and has, for high frequencies, directivity of primary sound-pressure gradient type obtained through synthesis of the signals from the first microphone unit 11 and the second microphone unit 12.

FIG. 5 is a diagram showing sound pressure frequency characteristic of the conventional directional microphone device 10.

In FIG. 5, the sound pressure sensitivity characteristic in the axial direction of the directivity and the spectrum of the thermal noise in the directional microphone device 10 are shown. As shown in FIG. 5, in the directional microphone device 10, it is possible to obtain directional characteristic at high frequency while overcoming the problem of the increase in thermal noise (decrease in sensitivity), by making only low frequency non-directional.

Patent Reference 1: Japanese Patent No. 2770594

DISCLOSURE OF INVENTION

Problems that Invention is to Solve

However, in the above conventional structure, the problem of the thermal noise is solved by dividing frequency range into non-directional range and directional range; and thus, solving the problem of thermal noise and obtaining directional characteristic at low frequency cannot be achieved at the same time. Further, in the case where miniaturization of microphone array size is required or ultra-directivity needs to be obtained through greater sound-pressure gradient type synthesis, the problem of the thermal noise increases, which makes the problem too big to ignore. Therefore, it is difficult for the conventional directional microphone device 10 to achieve miniaturization of the device and desired directional characteristic at broader frequency range at the same time.

The present invention is conceived to solve the above problems, and has an objective to provide a directional microphone device which suppresses the problem of increase in the thermal noise that occurs at the time of directivity synthesis (problem of decrease in sensitivity) and has high sensitivity.

Means to Solve the Problems

In order to achieve the above object, the present invention is conceived under the consideration that directivity is provided to microphone for eliminating sound from direction other than the direction of target sound, and focused on that the sound to be eliminated is loud sound which interrupts the target sound. The present invention obtains directivity while suppressing the increase in the thermal noise by controlling the directivity according to the amplitude range of signal waveform. More specifically, the directivity is controlled according to the amplitude range such that small amplitude range which does not require directivity but requires high sensitivity is made to be non-directional and large amplitude range which does requires directivity but does not require high sensitivity is made to be directional. This solves the problem of the thermal noise, and allows the directional microphone device which can obtain directivity while maintaining high sensitivity.

In order to achieve the above object, the present invention is a directional microphone device which includes: a plurality of microphones that are different in at least a directivity and a sensitivity characteristic; a control unit which generates an output signal using a signal outputted from each of the plurality of microphones; and an output unit which outputs the output signal generated by the control unit. The control unit generates the output signal such that (i) a nearly non-directional directivity and a high sensitivity are obtained in a small amplitude range of a sound wave arriving at the directional microphone device, and (ii) a directivity and a low sensitivity are obtained in a large amplitude range of the sound wave.

Further, the plurality of microphones may include a first microphone and a second microphone, the first microphone having a directivity where a main axis is oriented to a direction of a target sound, the second microphone having a directivity which is less than the directivity of the first microphone and where a main axis is oriented to the direction of the target sound. The directional microphone device may further includes a signal amplitude level detection unit which detects an amplitude level of a signal outputted from one of the first microphone and the second microphone, and the control unit may generate the output signal by mixing the signal outputted from the first microphone and the signal outputted from the second microphone such that (i) a ratio of the signal outputted from the first microphone is increased when the signal amplitude level detection unit detects that the amplitude of the signal is small, and (ii) a ratio of the signal outputted from the second microphone is increased when the signal amplitude level detection unit detects that the amplitude of the signal is large.

Further, the plurality of microphones may include a first microphone and a second microphone, the first microphone having sensitivity in a direction of a target sound, the second microphone having a directivity which is less than the directivity of the first microphone and where a minimum sensitivity is oriented to the direction of the target sound, and the control unit may include: a noise suppression unit which suppresses a noise component which is at the thermal noise level and is included in a signal outputted from the second microphone; and a subtraction unit which generates the output signal by subtracting a signal outputted from the noise suppression unit from a signal outputted from the first microphone.

Further, it may be that the noise suppression unit suppresses the noise component which is at the thermal noise level according to a nonlinear amplification characteristic in which an amplification factor only in the small amplitude range of the output signal is reduced.

Further, it may be that the noise suppression unit suppresses the noise component which is at the thermal noise level (i) by using a method for suppressing stationary noise which is at the thermal noise level, and (ii) according to a nonlinear amplification characteristic in which an amplification factor only in the small amplitude range is reduced.

Further, it may be that the directional microphone device further includes: a whitening filter unit which whitens a thermal noise component of the signal outputted from the second microphone, the whitening filter unit being positioned between the second microphone and the noise suppression unit; and an inverse whitening filter unit including an inverse characteristic of the whitening filter to which the signal outputted from the noise suppression unit is inputted, the inverse whitening filter unit being positioned between the noise suppression unit and the subtraction unit.

Further, it may be that: each of the signal outputted from the first microphone and the signal outputted from the second microphone is a signal obtained by synthesizing a signal outputted from a first microphone unit and a signal outputted from a second microphone unit, the first microphone unit and the second microphone unit having a same characteristic; the signal outputted from the first microphone is one of the signal outputted from the first microphone unit and the signal outputted from the second microphone unit, or a signal obtained by a synthesis through addition of the signal outputted from the first microphone unit and the signal outputted from the second microphone unit, the synthesis through addition increasing the sensitivity; and the signal outputted from the second microphone is a signal obtained by delaying, among the signal outputted from the first microphone unit and the signal outputted from the second microphone unit, the signal closer to the target sound and by subtracting the delayed signal from the other signal, the obtained signal having the minimum sensitivity in the direction of the target sound.

Further, it may be that the directional microphone device further includes a thermal noise estimation unit which estimates the thermal noise level of the signal outputted from the second microphone, based on a difference in level variation between the signal outputted from the first microphone and the signal outputted from the second microphone, and it may be that the noise suppression unit suppresses the noise component which is at the thermal noise level and is included in the signal outputted from the second microphone, based on the thermal noise level estimated by the thermal noise estimation unit.

Further, it may be that the signal outputted from the first microphone unit and the signal outputted from the second microphone unit are divided into frequency ranges for processing.

Further, it may be that the noise suppression unit determines, as a noise suppression frequency range, only a low frequency range where the sensitivity of the second microphone is lower than the sensitivity of the first microphone to the target sound, and to suppress the noise component which is at the thermal noise level for the noise suppression frequency range.

It should be noted that the present invention can be implemented, not only as a device, but also as an integrated circuit which includes processing units of such device, a method which includes the processing units of the device as steps, or a program that causes a computer to execute those steps.

Effects of the Invention

According to the present invention, it is possible to suppress the problem of increase in the thermal noise (problem of decrease in sensitivity) that occurs at the time of directivity synthesis, and to achieve a directional microphone device with high sensitivity. In other words, the directional microphone device of the present invention, which performs directivity synthesis of sound-pressure gradient type in which directivity is obtained through synthesis of signals from plural microphones, can obtain favorable microphone directivity without degradation of sensitivity (without increase in the thermal noise level).

BRIEF DESCRIPTION OF DRAWINGS

FIG. 10(*b*) is a diagram showing an example of waveform of output signal xB in the directivity synthesis unit 30. FIG. 10(*c*) is a diagram showing an example of waveform of output signal y from a signal addition unit 70.

FIG. 15D is a diagram showing an example of waveform of output signal y from a signal addition unit 71.

FIG. 24 is a diagram showing relationship of time variation PA and PB of signal xA and signal xB.

NUMERICAL REFERENCES

Figure 1:
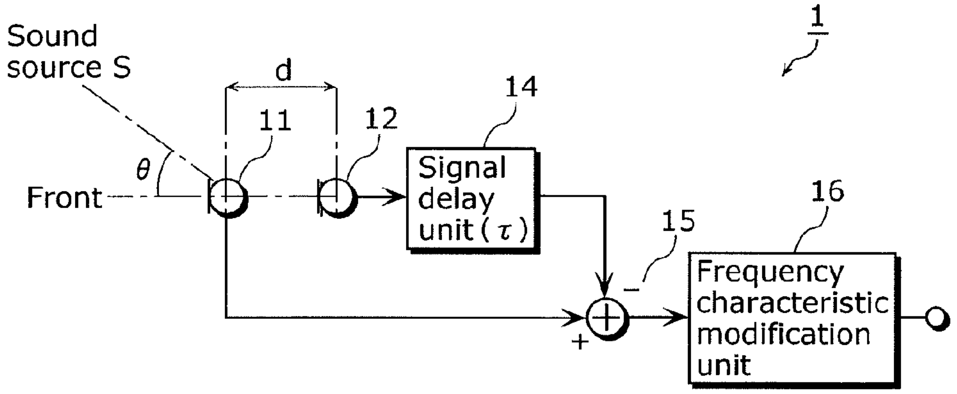
FIG. 1 PRIOR ART
FIG. 1 is a block diagram showing a structure of a conventional directional microphone device 1.
Figure 2A:
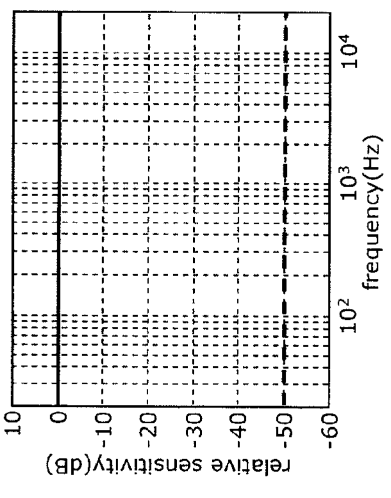
FIG. 2A PRIOR ART
FIG. 2A is a diagram showing sensitivity characteristic in the front direction and thermal noise spectrum in the first microphone unit 11 and the second microphone unit 12.
Figure 2B:
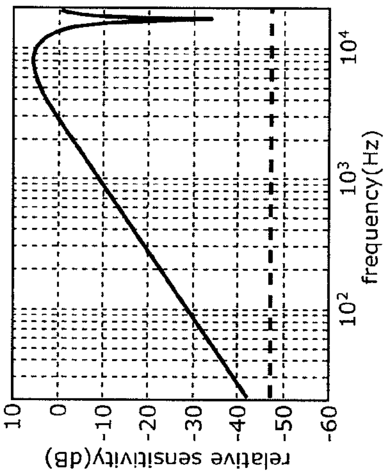
FIG. 2B PRIOR ART
FIG. 2B is a diagram showing sensitivity characteristic in the front direction and thermal noise spectrum in the signal subtraction unit 15.
Figure 2C:
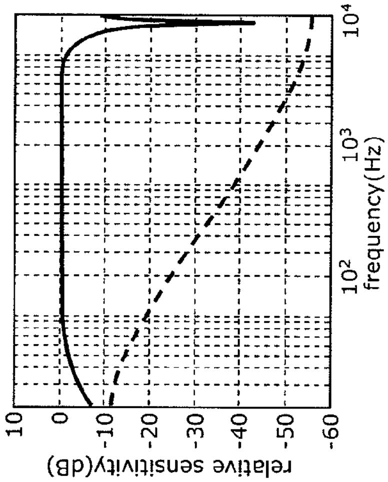
FIG. 2C PRIOR ART
FIG. 2C is a diagram showing sensitivity characteristic in the front direction and thermal noise spectrum in the frequency characteristic modification unit 16.
Figure 2C:
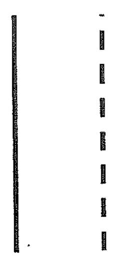
FIG. 2C PRIOR ART
Figure 3A:
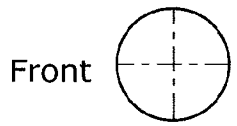
FIG. 3A PRIOR ART
FIG. 3A shows a directional pattern of the first microphone unit 11 and the second microphone unit 12.
Figure 3B:
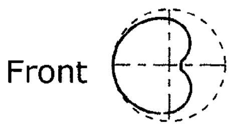
FIG. 3B PRIOR ART
FIG. 3B shows a directional pattern of the signal subtraction unit 15.
Figure 3C:
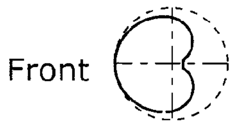
FIG. 3C PRIOR ART
FIG. 3C shows a directional pattern of the frequency characteristic modification unit 16.
Figure 4:
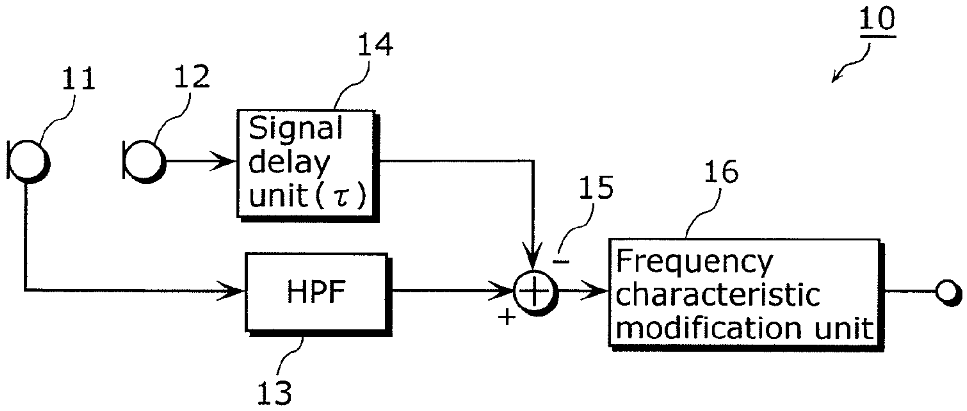
FIG. 4 PRIOR ART
FIG. 4 is a block diagram showing a structure of a conventional directional microphone device 10.
Figure 5:
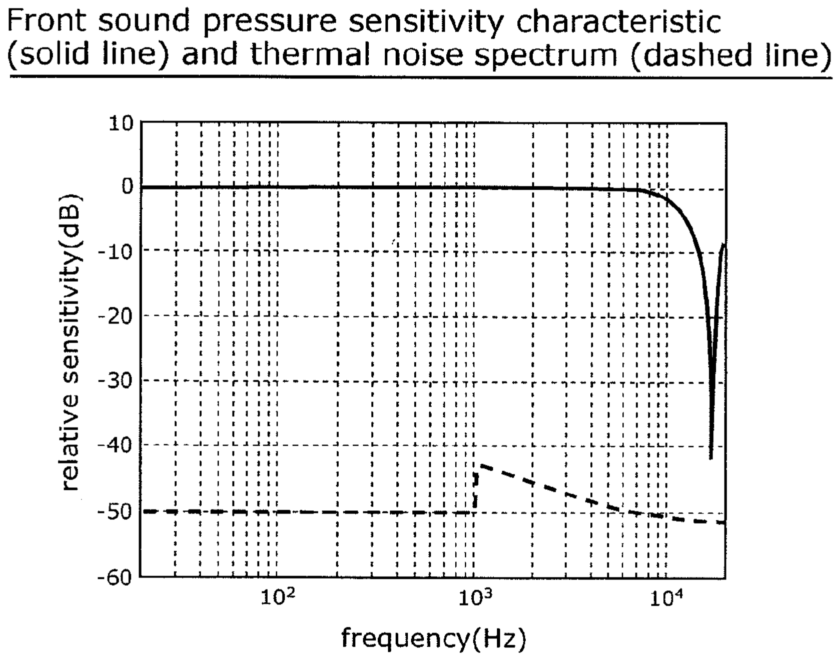
FIG. 5 PRIOR ART
FIG. 5 is a diagram showing sound pressure frequency characteristic of the conventional directional microphone device 10.

1, 10, 1000, 1001, 1002, 1003, 1004 Directional microphone device
11 First microphone unit
12 Second microphone unit
13 High pass filter
14, 41 Signal delay unit
15, 32, 34, 71 Signal subtraction unit
16 Frequency characteristic modification unit
20 Signal-synthesis sensitivity-increase unit
21 First signal delay unit
22, 70 Signal addition unit
23 Signal amplification unit
30 Directivity synthesis unit
31 Second signal delay unit
33 Frequency characteristic modification unit
40 Mix ratio calculation unit
50 First signal amplification unit
60 Second signal amplification unit
80 Output terminal
100 Noise suppression unit
101 Stationary noise suppression unit
102 Nonlinear amplification unit
110 Time-frequency domain conversion unit
111 Frequency-time domain conversion unit
200 Whitening filter unit
300 Thermal noise suppression estimation unit
321 First signal band limitation unit
322 First signal power calculation unit
323 First signal smoothing unit
324 First signal variation extraction unit
325 First signal absolute value calculation unit
326 Second signal smoothing unit
331 Second signal band limitation unit
332 Second signal power calculation unit
333 Third signal smoothing unit
334 Second signal variation extraction unit
335 Second signal absolute value calculation unit
336 Fourth signal smoothing unit
341 Frequency analysis unit
342 Signal power calculation unit

350 Thermal noise level determination unit
360 Smoothing and minimum value holding unit

BEST MODE FOR CARRYING OUT THE INVENTION

Hereinafter, embodiments of the present invention are described with reference to the drawings.

First Embodiment

Figure 6:
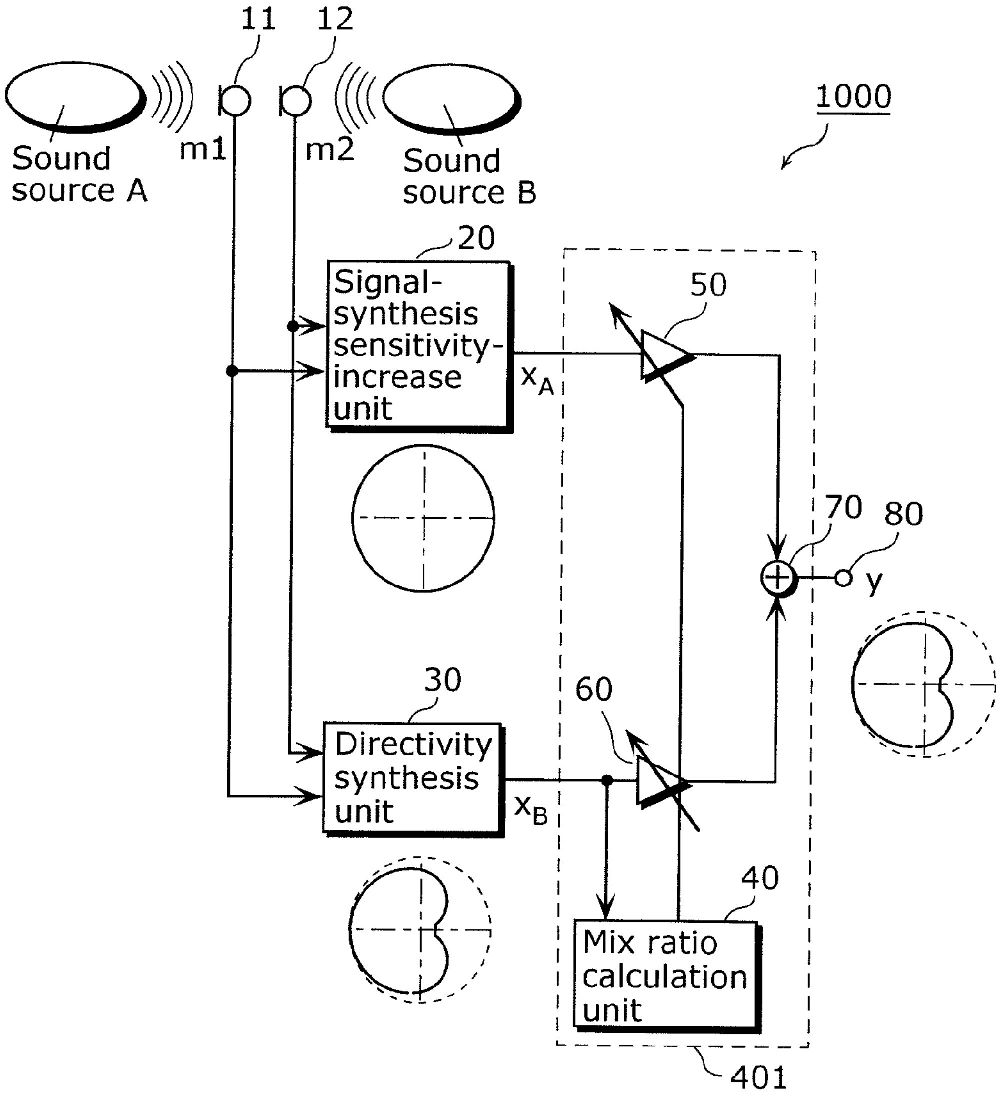
FIG. 6 is a block diagram showing a structure of a directional microphone device 1000 according to the first embodiment of the present invention.

FIG. 6 is a block diagram showing a structure of a directional microphone device 1000 according to the first embodiment of the present invention.

The directional microphone device 1000 includes: a first microphone unit 11; a second microphone unit 12; a signal-synthesis sensitivity-increase unit 20; a directivity synthesis unit 30; a mix ratio calculation unit 40; a first signal amplification unit 50; a second signal amplification unit 60; a signal addition unit 70; and an output terminal 80.

In FIG. 6, the first microphone unit 11 and the second microphone unit 12 are arranged such that the first microphone unit 11 is positioned closer to target sound (sound source A) and the second microphone unit 12 is positioned closer to non-target sound (sound source B).

The signal-synthesis sensitivity-increase unit 20 receives output signal m1 from the first microphone unit 11 and output signal m2 from the second microphone unit 12, and synthesize the signals so that sound pressure sensitivity of the directional microphone device 1000 is increased.

The directivity synthesis unit 30 receives the output signal m1 from the first microphone unit 11 and the output signal m2 from the second microphone unit 12, and synthesizes the signals so that directivity where main axis is oriented to the direction of the target sound (sound source A) can be obtained.

The mix ratio calculation unit 40 receives the output signal from the directivity synthesis unit 30, and calculates, based on the amplitude value of the received signal, amplification factor GA and amplification factor GB for determining mix ratio of the signals in the signal addition unit 70.

The first signal amplification unit 50 amplifies the output signal from the signal-synthesis sensitivity-increase unit 20, based on the amplification factor GA calculated and provided by the mix ratio calculation unit 40.

The second signal amplification unit 60 amplifies the output signal from the directivity synthesis unit 30, based on the amplification factor GB calculated and provided by the mix ratio calculation unit 40.

The signal addition unit 70 adds the output signal provided from the first signal amplification unit 50 and the output signal provided from the second signal amplification unit 60, and provides the added signal to the output terminal 80.

The directional microphone device 1000 has the structure as described above.

Note that the mix ratio calculation unit 40, the first signal amplification unit 50, the second signal amplification unit 60 and the signal addition unit 70 may form a control unit 401.

Next, the operation of the directional microphone device 1000 is described.

Figure 7:
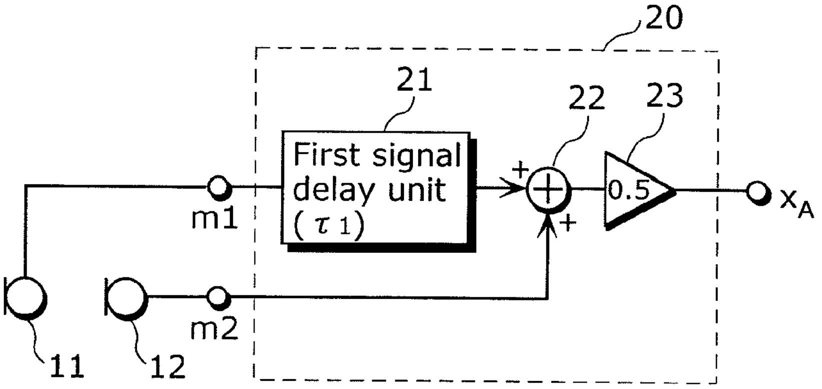
FIG. 7 is a diagram showing a structure of a signal-synthesis sensitivity-increase unit 20 according to the first embodiment of the present invention.

FIG. 7 is a diagram showing a structure of the signal-synthesis sensitivity-increase unit 20 according to the first embodiment of the present invention.

The signal-synthesis sensitivity-increase unit 20 includes a first signal delay unit 21, a signal addition unit 22, and a signal amplification unit 23. Here, in the signal-synthesis sensitivity-increase unit 20, as shown in FIG. 7, for example, in-phase addition is performed so that absolute sensitivity of the microphone with respect to the target sound (sound source A) is increased (so that the thermal noise is decreased with respect to the sound pressure sensitivity).

More specifically, where the spacing between the microphone units is d, the output signal from the first microphone unit 11 is delayed by the first signal delay unit 21 by delay time $\tau 1 = d \cdot \cos(\theta 1)/c$ (where c is velocity of sound. In FIG. 6, $\theta 1 = 0$.). Then, the delayed signal is added to the output signal from the second microphone unit 12 by the signal addition unit 22. By doing so, in the case of two microphone units, the absolute sensitivity increases by approximately 3 dB due to the effect of the in-phase addition.

Note that the microphone unit spacing d is determined by frequency range required by the directional microphone device 1000 or constraints on the installation space. Thus, the value of the spacing d can be arbitrarily chosen, but here, it is assumed that d is approximately ranging from 5 mm to 30 mm in view of frequency range.

Figure 8:
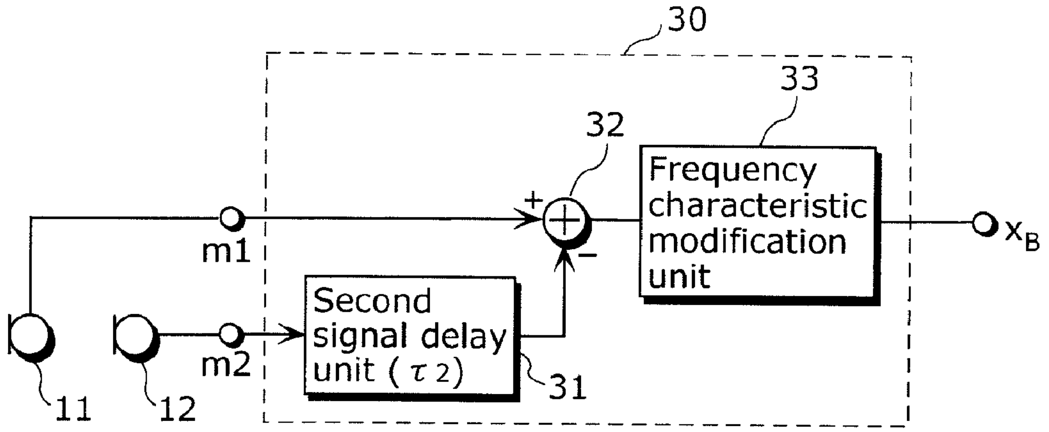
FIG. 8 is a diagram showing a structure of a directivity synthesis unit 30 according to the first embodiment of the present invention.

FIG. 8 is a diagram showing a structure of the directivity synthesis unit 30 according to the first embodiment of the present invention.

The directivity synthesis unit 30 includes a second signal delay unit 31, a signal subtraction unit 32, and a frequency characteristic modification unit 33.

In the directivity synthesis unit 30, as shown in FIG. 8, for example, directivity synthesis of sound-pressure gradient type is performed such that directivity is obtained where sensitivity to the target sound (sound source A) is high and sensitivity to the non-target sound (sound source B) is low.

More specifically, where the spacing between the microphone units is d, the output signal from the second microphone unit 12 is delayed by the second signal delay unit 31 by delay time $\tau 2 = d \cdot \cos(\theta 2)/c$ (where c is velocity of sound. In FIG. 6, $\theta 2 = 0$.). Then, the delayed signal is subtracted from the output signal from the first microphone unit 11 by the signal subtraction unit 32.

In such a manner, the directivity synthesis of sound-pressure gradient type is performed, thereby providing a directional output signal in which main axis of directivity is oriented to the direction of the target sound (sound source A).

The frequency characteristic modification unit 33 equalizes sound pressure sensitivity with respect to the target sound (sound source A) of the signal-synthesis sensitivity-increase unit 20 by modifying the front sensitivity characteristic of the output signal from the signal subtraction unit 32 to flat.

At this point, the output signal xA, which has a nearly non-directional directivity but has a high absolute sensitivity, is obtained from the signal-synthesis sensitivity-increase unit 20. On the other hand, the output signal xB, which has a directivity but has a low sensitivity that is one of the problems associated with sound-pressure gradient type synthesis, is obtained from the directivity synthesis unit 30.

The mix ratio calculation unit 40, the first signal amplification unit 50, and the second signal amplification unit 60 change the mix ratio of the signals having two characteristics provided from the signal-synthesis sensitivity-increase unit 20 and the directivity synthesis unit 30, according to the output signal amplitude level from the directivity synthesis unit 30.

The mix ratio calculation unit 40 performs calculation, for example, as described below, in order to obtain the amplification factor GA in the first signal amplification unit 50 and the amplification factor GB in the second signal amplification unit 60.

The thermal noise amplitude level Nc of the output signal from the directivity synthesis unit 30 is obtained in advance based on, for example, specification of the first microphone unit 11 and the second microphone unit 12. Let the input signal to the mix ratio calculation unit 40 be xB, the amplification factor GB can be expressed as indicated by Formula 4.

$$GB = \left[\alpha \frac{(x_B)^2}{(N_c)^2}\right]_{max=1} \quad \text{[Formula 4]}$$

Note that $[\cdot]_{max}=1$ indicates that the parenthetic value is clipped by 1 at maximum.

Figure 9:
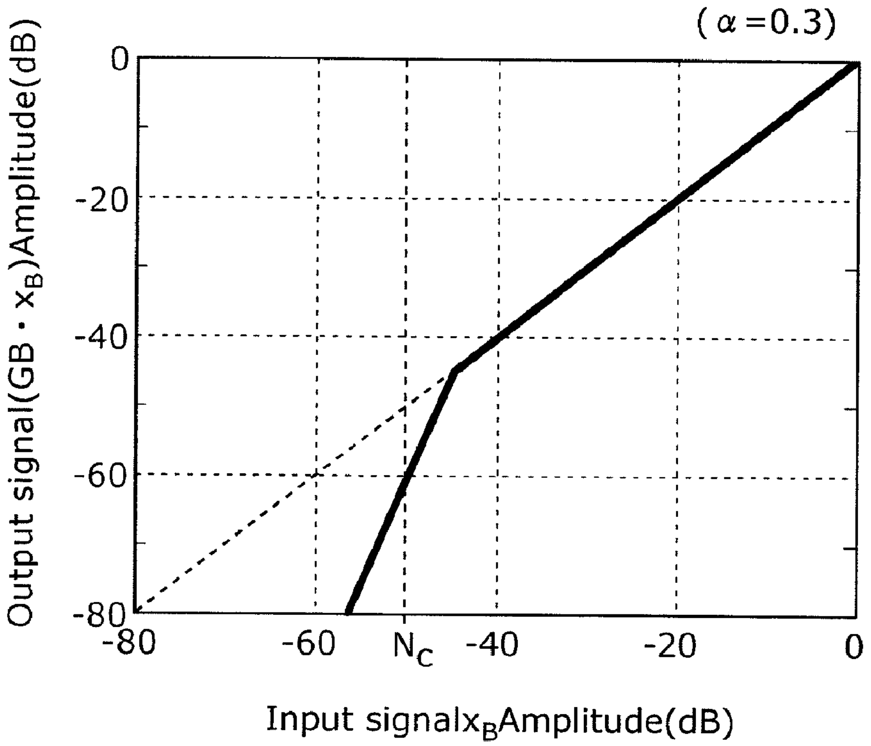
FIG. 9 is a diagram showing an example of nonlinear amplification characteristic of amplification factor GB according to the first embodiment of the present invention.

FIG. 9 is a diagram showing an example of nonlinear amplification characteristic of the amplification factor GB according to the first embodiment of the present invention. FIG. 9 shows nonlinear amplification characteristic of the amplification factor GB in the case where Formula 4 is used. Here, when a is set to be a value smaller than 1, the amplitude level of the input signal xB is attenuated by a times at the thermal noise maximum amplitude level Nc.

$$\frac{N_C}{\sqrt{\alpha}} \quad \text{[Formula 5]}$$

Therefore, in the amplitude range where the amplitude level of the input signal xB is greater than Formula 5, waveform is transmitted linearly without change. Therefore, amplification of the output signal, provided from the directivity synthesis unit 30 and having directivity, is controlled by the second signal amplification unit 60 based on the amplification factor GB calculated by the mix ratio calculation unit 40. More specifically, the output signal from the directivity synthesis unit 30 is attenuated in the amplitude range of the thermal noise level, and waveform of the output signal is transmitted linearly without change in the amplitude range greater than Formula 5, thereby only waveform of the output signal of the large amplitude range is provided.

Further, for example, it is assumed that the amplification factor GA is operated in accordance with Formula 6.

$$GA=1-GB \quad \text{[Formula 6]}$$

In this case, the amplification factor GA is operated so as to supply the decrease of the amplification factor GB.

Accordingly, the output signal from the signal addition unit 70 which adds the output signals from the first signal amplification unit 50 and the second signal amplification unit 60 becomes GB<<GA when the amplitude of the signal xB is small, thereby the waveform of the output signal xA from the signal-synthesis sensitivity-increase unit 20 is provided. When the amplitude of the signal xB is large, the output signal from the signal addition unit 70 becomes GA<<GB, thereby the waveform of the output signal xB from the directivity synthesis unit 30 is provided. Thus, in the directional microphone device 1000, such control is performed that the signal xB having high sensitivity is provided through the output terminal 80 when the signal amplitude is small, and the signal xA having directivity is outputted through the output terminal 80 when the signal amplitude is large.

Figure 10:
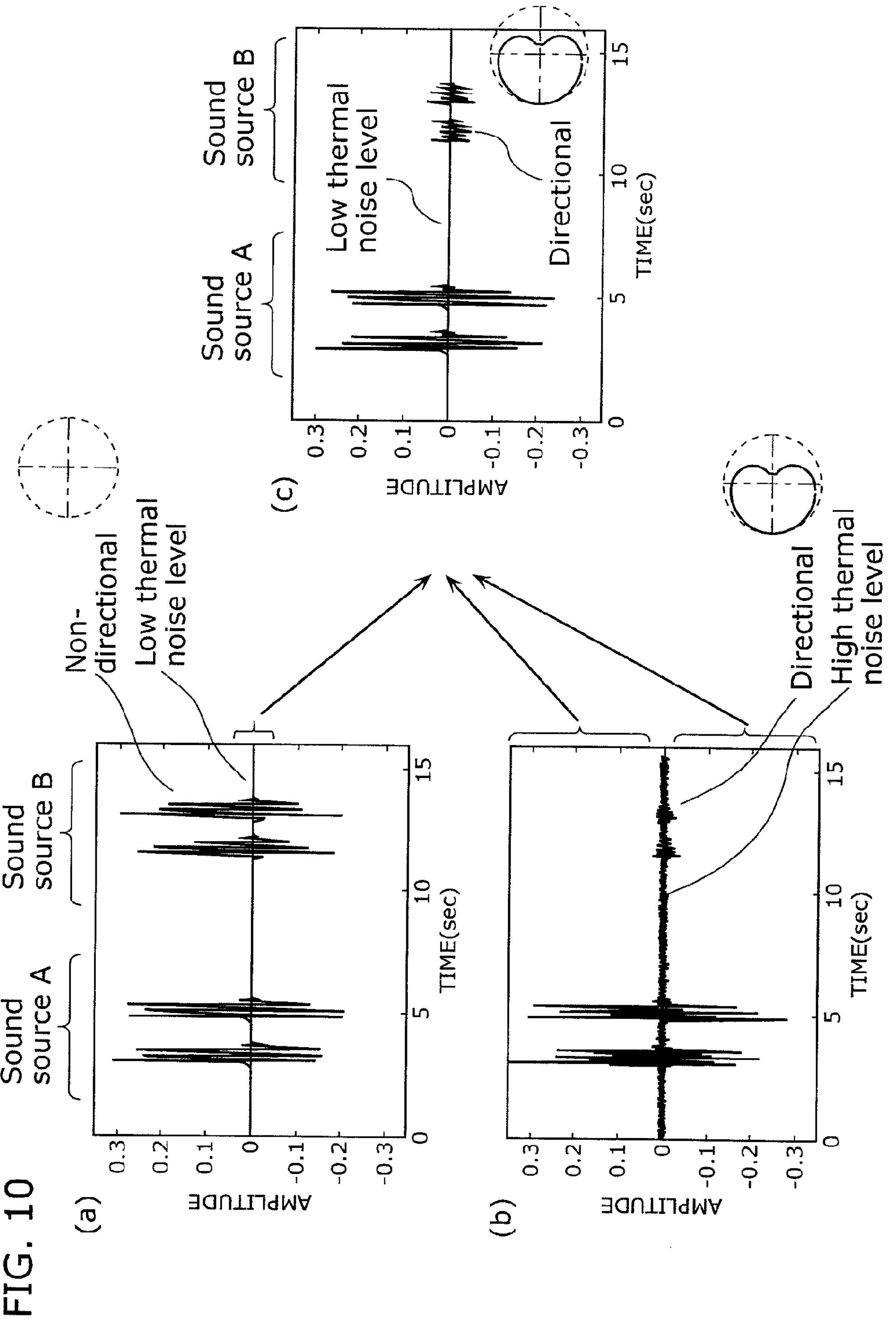
FIG. 10(*a*) is a diagram showing an example of waveform of output signal xA in the signal-synthesis sensitivity-increase unit 20.

FIG. 10(*a*) to (*c*) are diagrams showing examples of output waveform signals of each processing block according to the first embodiment of the present invention. FIG. 10(*a*) shows an example of waveform of the output signal xA in the signal-synthesis sensitivity-increase unit 20. FIG. 10(*b*) shows an example of waveform of the output signal xB in the directivity synthesis unit 30. Further, FIG. 10(C) shows an example of waveform of the output signal y from the signal addition unit 70.

The characteristic of the waveform of the output signal xA shown in FIG. 10(*a*) is that directivity is not obtained with respect to the sound sources A and B, but thermal noise level is low in the small signal amplitude range. Here, the thermal noise is relatively decreased with respect to the sound pressure sensitivity by the signal-synthesis sensitivity-increase unit 20 performing in-phase addition on the signals from the first microphone unit 11 and the second microphone unit 12.

As seen from FIG. 10(*b*), the characteristic of waveform of the output signal xB is that thermal noise level is high and sensitivity is low, but directivity is obtained which suppresses the sound source B among the sound sources A and B. Here, sensitivity is increased with respect to the target sound (sound source A) and sensitivity is decreased with respect to the non-target sound (sound source B) by the directivity synthesis unit 30 performing the directivity synthesis on the signals from the first microphone unit 11 and the second microphone unit 12. Note that the thermal noise is relatively high with respect to the sound pressure sensitivity.

The waveform of the output signal y shown in FIG. 10(*c*) is a waveform of the output signal from the directional microphone device 1000, and is controlled such that xA is dominant in the small amplitude range, and xB is dominant in the large amplitude range. The waveform of the output signal y of FIG. 10(*c*) shows that the directional microphone device 1000 provides the output signal having directivity and low thermal noise level.

Figure 11:
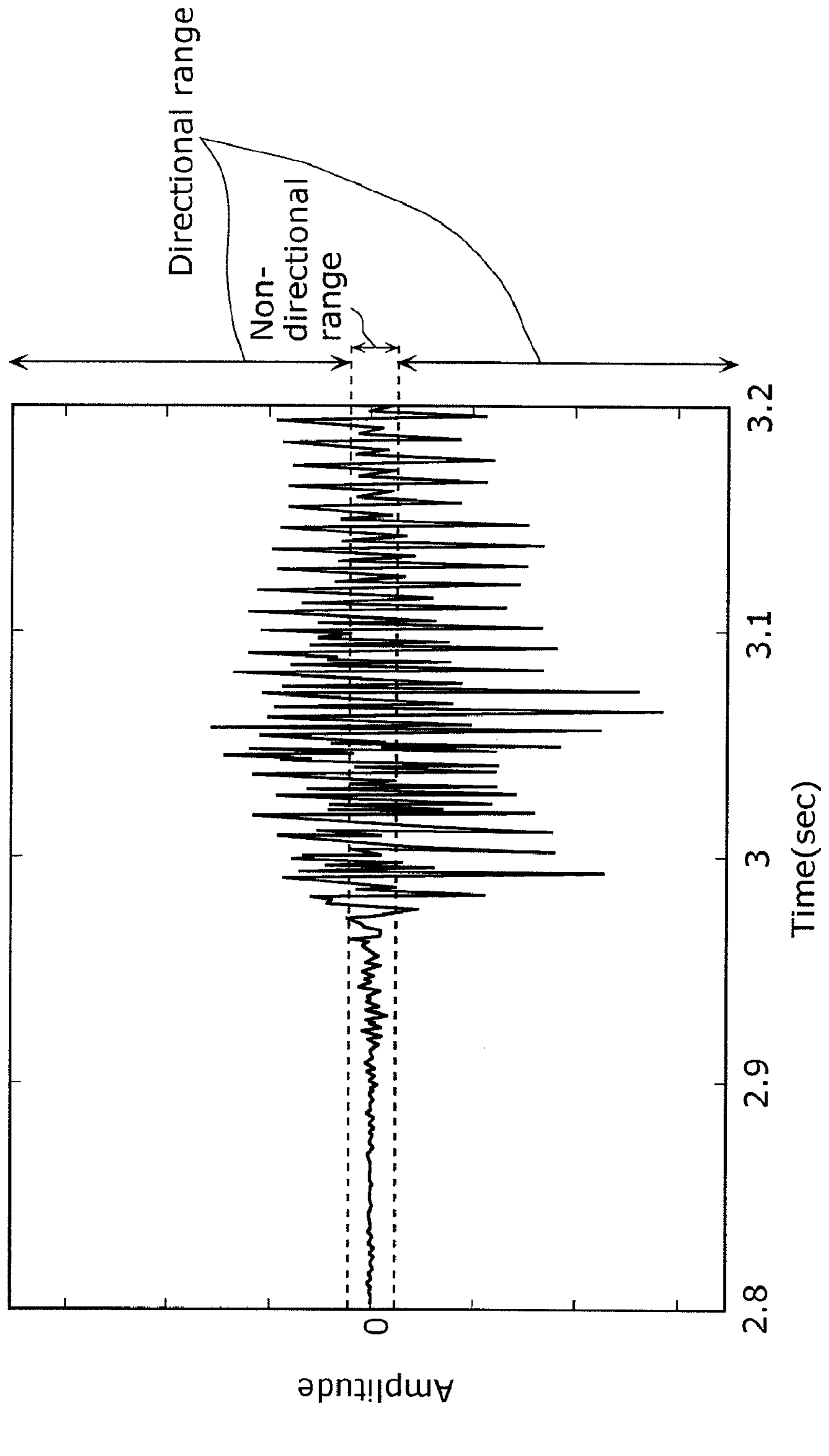
FIG. 11 is a relationship diagram of signal amplitude and directivity control region according to the first embodiment of the present invention.
Figure 12:
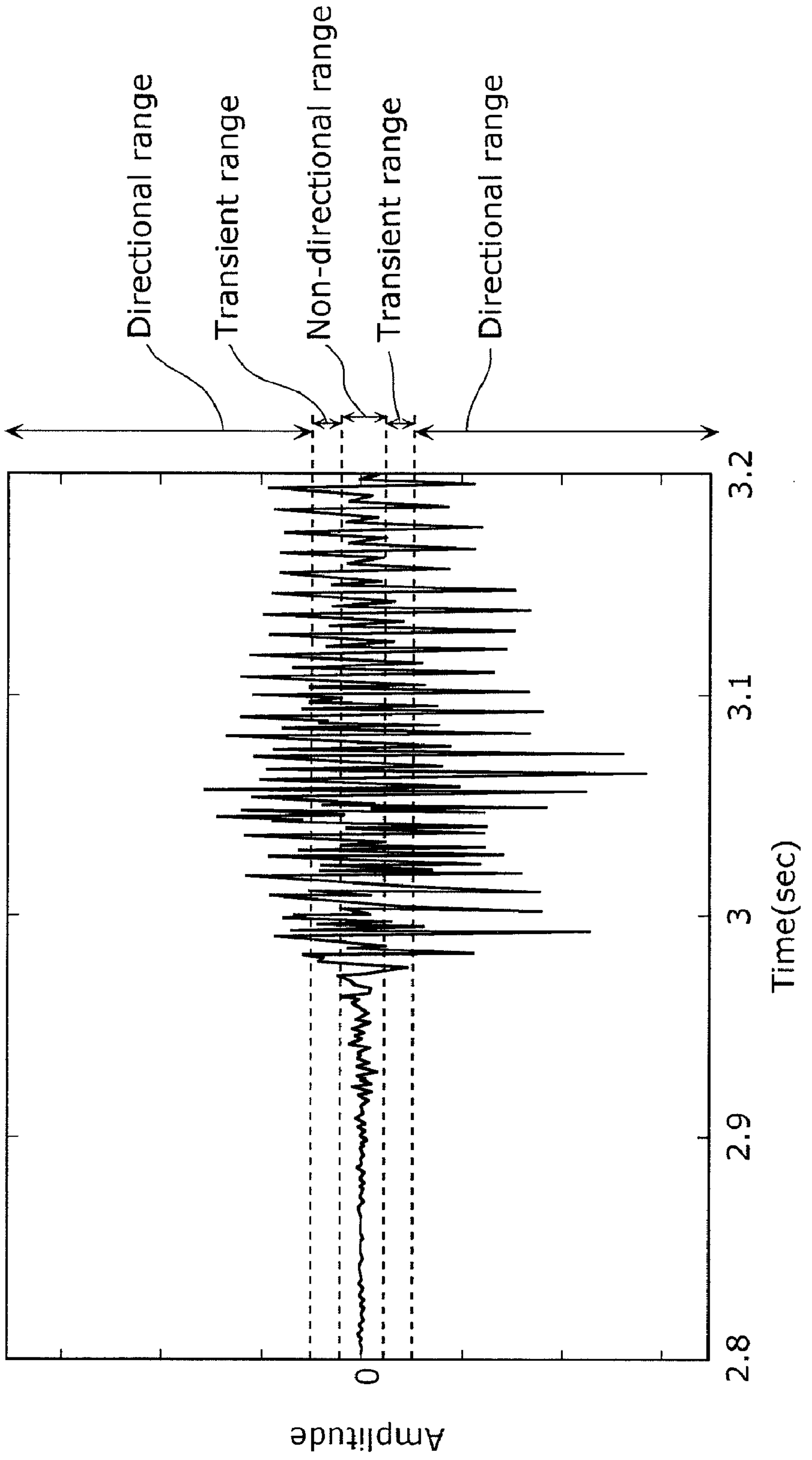
FIG. 12 is a relationship diagram of the signal amplitude and the directivity control region according to the first embodiment of the present invention.

FIG. 11 and FIG. 12 are relationship diagrams of signal amplitude and directivity control range according to the first embodiment of the present invention.

As described above, the directional microphone device 1000 can obtain directivity while maintaining high sensitivity, by controlling directivity such that non-directional directivity is obtained at the non-directional range shown in FIG. 11, that is, small amplitude range where the amplitude of the output signal is small, and directivity is obtained at the directional range shown in FIG. 11, that is, large amplitude range where the amplitude of the output signal is large.

Further, in the first embodiment, the example has been shown in which the second signal amplification unit 60 determines GB uniquely using Formula 4 based on the waveform amplitude level of the output signal xB. However, it may be that smoothing process may be performed at the time of switching of the waveform of the signal xB and the signal xA according to variation of the amplitude amount of the signal xB. In such a case, it is possible to reduce the problem of distortion of the waveform at the time of switching of the waveform of the signal xB and the signal xA according to variation of amplitude amount of the signal xB. The following formula is an example of formula for obtaining GB where the smoothing parameter is β.

$$GB = (1-\beta)GB + \beta\left[\alpha \frac{(x_B)^2}{(N_c)^2}\right]_{max=1} \quad \text{[Formula 7]}$$

At this time, as shown in FIG. 12, the output waveform y from the directional microphone device 1000 has a longer transient range between the non-directional range where a nearly non-directional directivity and high sensitivity are obtained and the directional range where a directivity and a low sensitivity are obtained, that is, a longer switching period of the waveform of the signal xB and the signal xA according to variation of amplitude amount of the signal B.

In such a manner, by controlling directivity such that the small amplitude range is made to be non-directional and the large amplitude range is made to be directional, it is possible to achieve the directional microphone device 1000 which has both high sensitivity (low thermal noise level) and directivity.

Note that in the first embodiment, the example has been described where the output signal xA which has a nearly non-directional directivity but has a high absolute sensitivity is obtained with the structure of the first microphone unit 11, the second microphone unit 12 and the signal-synthesis sensitivity-increase unit 20; however, the present invention is not limited to this. More specifically, it may be that a single microphone has functions of the first microphone unit 11, the second microphone unit 12 and the signal-synthesis sensitivity-increase unit 20 so that the single microphone provides the output signal xA which has a nearly non-directional directivity but has a high absolute sensitivity.

Similarly, the example has been described where the output signal xB is obtained which has directivity but has low sensitivity that is a problem associated with the sound-pressure gradient type synthesis, with the structure of the first microphone unit 11, the second microphone unit 12, and the directivity synthesis unit 30; however, the present invention is not limited to this. More specifically, it may be that a single directional microphone has functions of the first microphone unit 11, the second microphone unit 12 and the directivity synthesis unit 30, and the single directional microphone provides the output signal xB which has directivity but has low sensitivity which is a problem associated with the sound-pressure gradient type synthesis.

Second Embodiment

Figure 13:
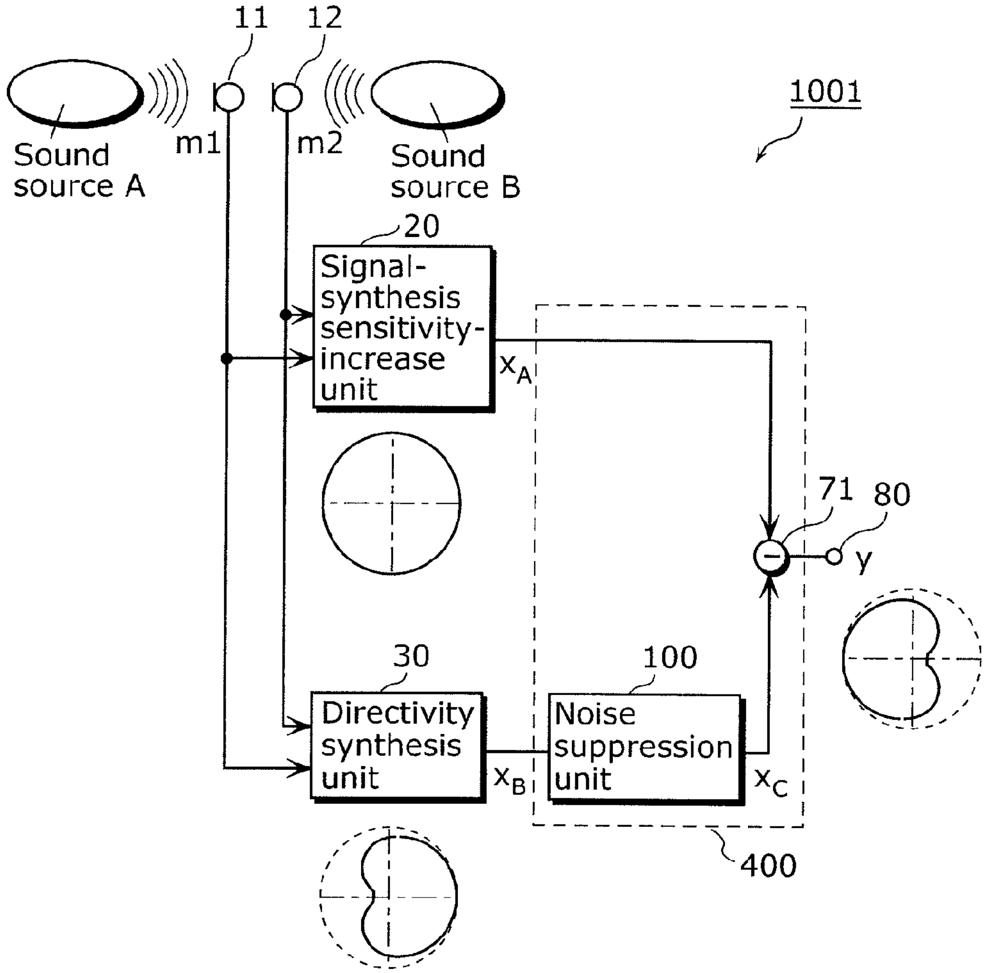
FIG. 13 is a block diagram showing a structure of a directional microphone device 1001 according to the second embodiment of the present invention.

FIG. 13 is a block diagram showing a structure of a directional microphone device 1001 according to the second embodiment of the present invention.

The directional microphone device 1001 includes: a first microphone unit 11; a second microphone unit 12; a signal-synthesis sensitivity-increase unit 20; a directivity synthesis unit 30; a signal subtraction unit 71; an output terminal 80; and a noise suppression unit 100.

In FIG. 13, the first microphone unit 11 and the second microphone unit 12 are arranged such that the first microphone unit 11 is positioned closer to a target sound (sound source A) and the second microphone unit 12 is positioned closer to a non-target sound (sound source B).

The signal-synthesis sensitivity-increase unit 20 receives an output signal m1 from the first microphone unit 11 and an output signal m2 from the second microphone unit 12, and synthesizes the signals so that sound pressure sensitivity of the directional microphone device 1001 is increased.

The directivity synthesis unit 30 receives the output signal m1 from the first microphone unit 11 and the output signal m2 from the second microphone unit 12, and synthesizes the signals so that the direction of minimum sensitivity of directivity is oriented to the direction of the target sound (sound source A).

The noise suppression unit 100 receives the output signal from the directivity synthesis unit 30, and reconstructs waveform of component other than thermal noise component for large amplitude range while eliminating the thermal noise component in the received signal.

The signal subtraction unit 71 performs subtraction on output signals from the signal-synthesis sensitivity-increase unit 20 and the noise suppression unit 100, and provides the resulting signal to the output terminal 80.

The directional microphone device 1001 has the structure as described above.

The noise suppression unit 100 and the signal subtraction unit 71 may form a control unit 400.

Next, the operation of the directional microphone device 1001 is described.

In the above first embodiment, the output signal from the output terminal 80 with respect to the target sound (sound source A) is a signal obtained through synthesis in which the mixing ratio of the output signal xA from the signal-synthesis sensitivity-increase unit 20 and the output signal xB from the directivity synthesis unit 30 is changed according to the small amplitude range and the large amplitude range. Thus, in the output signal from the output terminal 80, there is a problem that distortion is likely to occur at the switching portion of the two signals having different characteristics with respect to the target sound (sound source A).

Therefore, in the second embodiment, the structure of the directional microphone device 1001 is described which controls directivity in low amplitude range and large amplitude range without adjusting mixing ratio so that distortion with respect to the target sound (sound source A) is not generated.

Figure 14:
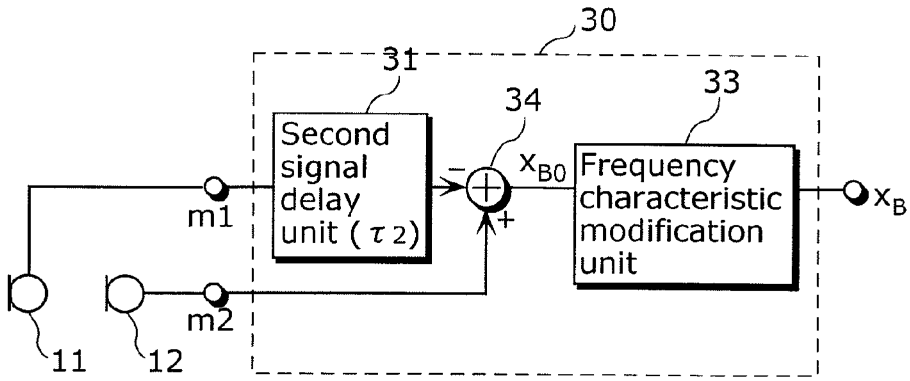
FIG. 14 is a diagram showing a structure of a directivity synthesis unit 30 according to the second embodiment of the present invention.

FIG. 14 is a diagram showing a structure of the directivity synthesis unit 30 according to the second embodiment of the present invention.

Figure 15A:
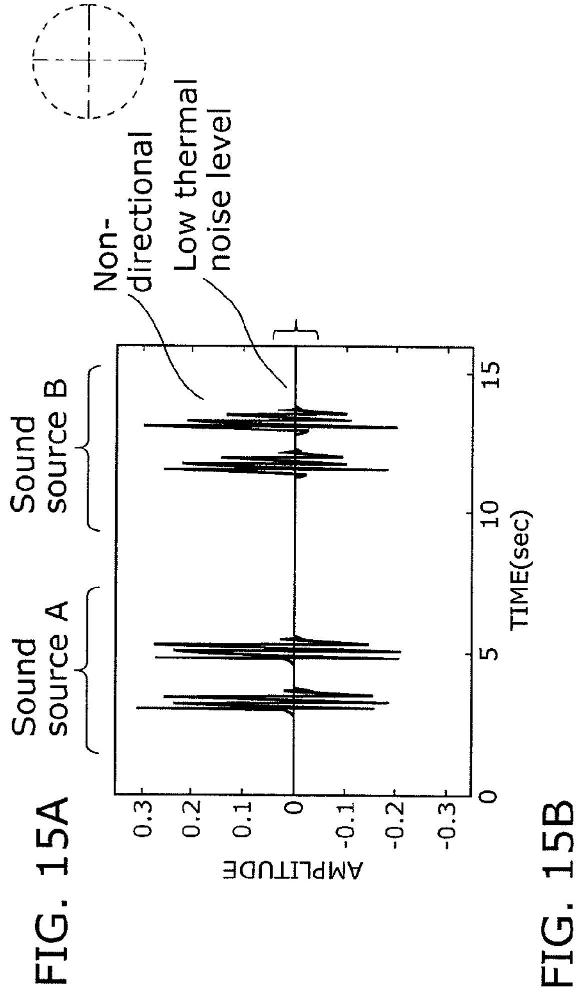
FIG. 15A is a diagram showing an example of waveform of output signal xA in the signal-synthesis sensitivity-increase unit 20.
Figure 15B:
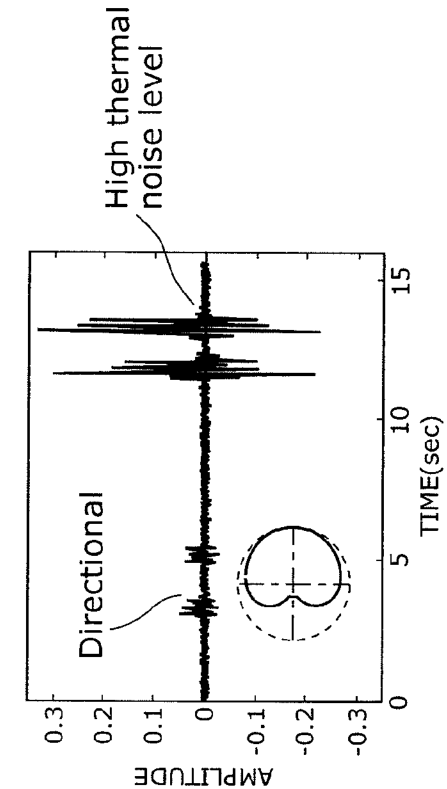
FIG. 15B is a diagram showing an example of waveform of output signal xB in the directivity synthesis unit 30.
Figure 15C:
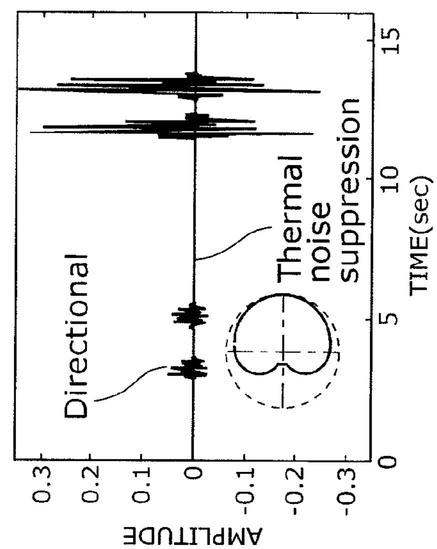
FIG. 15C is a diagram showing an example of waveform of output signal xC from a noise suppression unit 100.
Figure 15C:
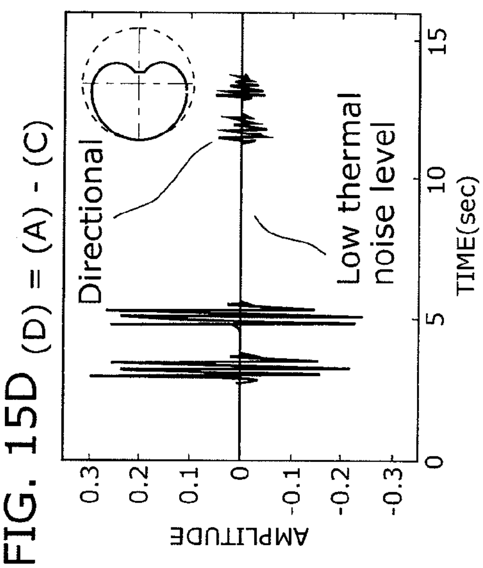

FIGS. 15A to 15D are diagrams showing examples of output waveform signals of each processing block according to the second embodiment of the present invention. FIG. 15A shows an example of waveform of the output signal xA in the signal-synthesis sensitivity-increase unit 20. FIG. 15B shows an example of waveform of the output signal xB in the directivity synthesis unit 30. Further, FIG. 15C shows an example of waveform of the output signal xC from the noise suppression unit 100. FIG. 15D shows an example of waveform of the output signal y from the signal subtraction unit 71.

The signal-synthesis sensitivity-increase unit 20 has the same structure as described in the first embodiment, and performs in-phase addition so that the absolute sensitivity of the microphone is improved with respect to the target sound (sound source A) (so that the thermal noise is decreased with respect to the sound pressure sensitivity). The example of the signal waveform of the output signal xA is shown in FIG. 15A. More specifically, such a characteristic is shown that directivity with respect to the sound sources A and B is not obtained, but thermal noise level in small amplitude range is low.

The directivity synthesis unit 30 includes, as shown in FIG. 14, a second signal delay unit 31, a signal subtraction unit 34, and a frequency characteristic modification unit 33. The directivity synthesis unit 30 in the present embodiment differs from that in the first embodiment in that the second signal delay unit 31 delays the output signal m1 from the first microphone unit 11, and the direction of subtraction of the signal subtraction unit 34 is opposite to that of the signal subtraction unit 32.

The directivity synthesis unit 30 synthesizes directivity so that the direction of minimum sensitivity is oriented to the direction of the target sound. For example, as in FIG. 14, directivity synthesis of the sound pressure gradient type is performed such that sensitivity is low with respect to the target sound (sound source A) and sensitivity is high with respect to the non-target sound (sound source B).

More specifically, where the spacing between the microphone units is d, the output signal m1 from the first microphone unit 11 is delayed by the second signal delay unit 31 by delay time τ2=d/c (where c is velocity of sound). Then, the delayed signal is subtracted from the output signal from the second microphone unit 12 by the signal subtraction unit 34.

By doing so, directivity synthesis of the sound pressure gradient type is performed so that minimum sensitivity is formed in the direction of the target sound (sound source A). At this time, as shown in FIG. 15B, due to the directivity synthesis of the sound pressure gradient type (subtraction type), the output signal xB from the directivity synthesis unit 30 has low sound pressure sensitivity and relatively high thermal noise level with respect to the sound pressure sensitivity. However, the output signal xB from the directivity synthesis unit 30 is a signal output in which the target sound (sound source A) is eliminated and the non-target sound (sound source B) is extracted by directivity. More specifically, the signal output is obtained having directivity where main axis is oriented to the non-target sound (sound source B).

Further, the noise suppression unit 100 shown in FIG. 13 suppresses waveform amplitude of the small amplitude level which is in the thermal noise level. For example, signals in small amplitude range are suppressed while maintaining waveform information at large amplitude level, using Formula 4 or Formula 7.

FIG. 15C shows an example of output signal xC of the noise suppression unit 100. More specifically, the signal component in the direction of the target sound is suppressed by the directivity processing performed by the directivity synthesis unit 30, and the signal in the small amplitude range is suppressed by the processing performed by the noise suppression unit 100. As a result, only the signal waveform in the large amplitude range of the non-target sound (sound source B) is provided as the output signal xC from the noise suppression unit 100.

The signal subtraction unit 71 subtracts, from the output signal xA which is provided from the signal-synthesis sensitivity-increase unit 20 and has a nearly non-directional directivity and a high absolute sensitivity, the output signal xC which is provided from the noise suppression unit 100 and has a directivity in the direction of the non-target sound (sound source B) and in which signal component in large amplitude range is dominant. This allows the signal subtraction unit 71 to cancel the sensitivity in the direction of the non-target sound (sound source B), thereby, as shown in FIG. 15D, forming the minimum sensitivity of directivity in the direction of the non-target sound (sound source B).

Further, the noise suppression unit 100 suppresses the signal in the small amplitude range before subtraction by the signal subtraction unit 71; and thus, directivity synthesis is not performed in the small amplitude range. Therefore, as shown in FIG. 15D, the signal subtraction unit 71 can obtain a signal having a high absolute sensitivity and a non-directional directivity from the output signal xA of the signal-synthesis sensitivity-increase unit 20.

As described, according to the structure of the directional microphone device 1001 of the second embodiment, nonlinear processing is not added directly to the target sound (sound source A). This makes it difficult to cause degradation of sound quality and loss of information. This is because the output signal from the noise suppression unit 100, which is a cause of distortion, is sufficiently small with respect to the signal component of the target sound, and the output signal xA from the signal-synthesis sensitivity-increase unit 20 is provided without change.

Further, the distortion caused due to the nonlinear processing performed in the directional microphone device 1001 occurs in the noise suppression unit 100, and especially, it tends to occur in the small amplitude range of the non-target sound direction. However, the noise suppression unit 100 can utilize countermeasure for distortion such as adaptive control of nonlinear amplification characteristic; and thus, it is possible to achieve the directional microphone device 1001 with higher sound quality compared to that of the first embodiment.

Figure 16:
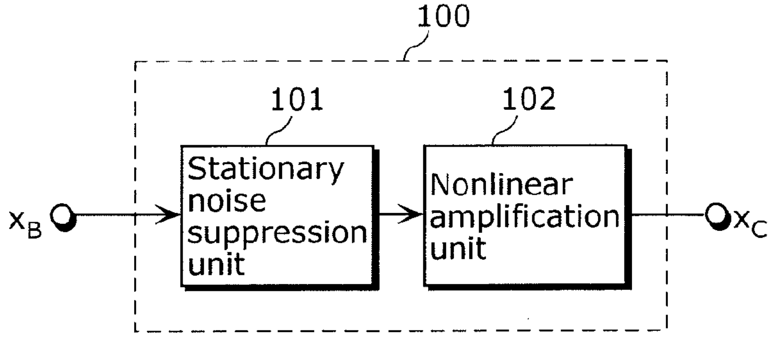
FIG. 16 is a diagram showing an example of another structure of the noise suppression unit 100 according to the second embodiment of the present invention.
Figure 17:
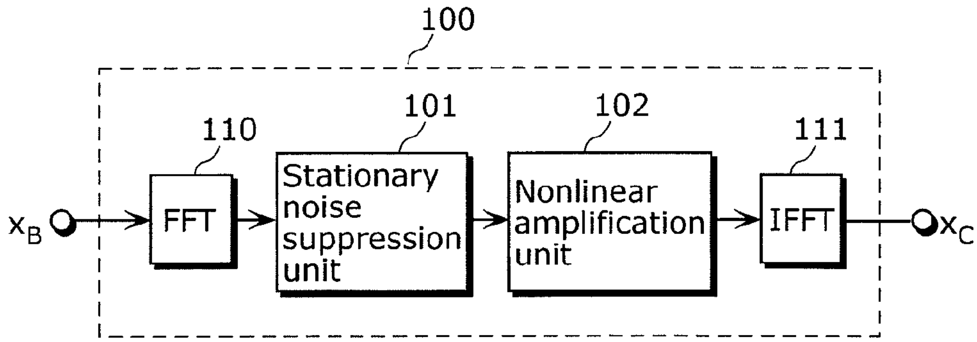
FIG. 17 is a diagram showing an example of still another structure of the noise suppression unit 100 according to the second embodiment of the present invention.

Further, FIG. 16 and FIG. 17 are diagrams showing examples of other structures of the noise suppression unit 100 according to the second embodiment of the present invention. In the noise suppression unit 100, in the case where a signal in the small amplitude range is suppressed only by Formula 4 or Formula 7, breathing noise (phenomenon in which suppressed noise appears in the background relative to the signal component in the large amplitude range) which is a general problem associated with noise suppression using nonlinear amplification. However, the problem is solved by, for example, as shown in FIG. 16, including the stationary noise suppression unit 101 (spectral subtraction, for example) and the nonlinear amplification unit 102 in the noise suppression unit 100 or simultaneously functioning operation of the stationary noise suppression unit 101 and the nonlinear amplification unit 102.

Further, as shown in FIG. 17, in the noise suppression unit 100, a time-frequency domain conversion unit 110 (referred to as FFT in the figure) and a frequency-time domain conversion unit 111 (referred to as IFFT in the figure) may perform processing for each frequency component.

Third Embodiment

Figure 18:
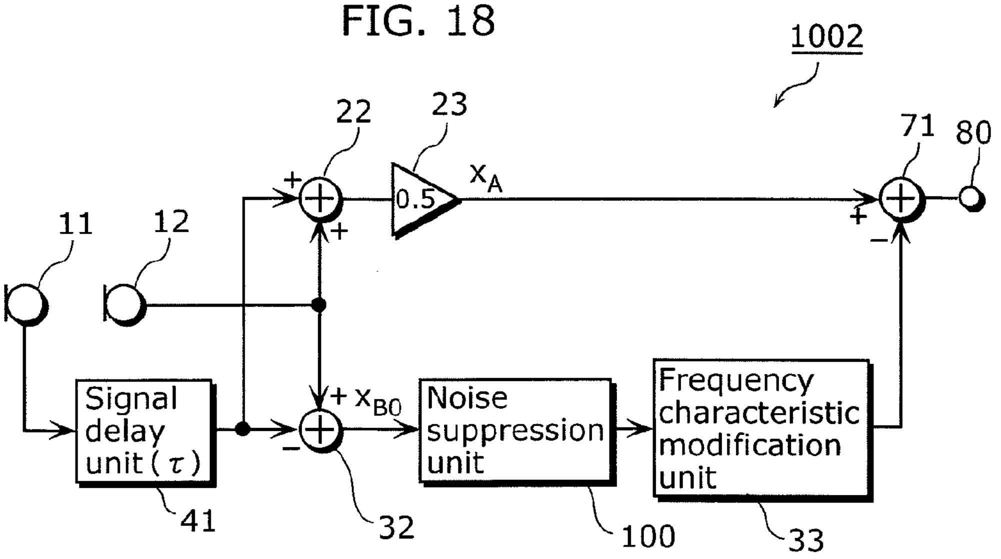
FIG. 18 is a block diagram showing a structure of a directional microphone device 1002 according to third embodiment of the present invention.

FIG. 18 is a block diagram showing a structure of a directional microphone device 1002 according to the third embodiment of the present invention.

In FIG. 18, the directional microphone device 1002 includes a first microphone unit 11 and a second microphone unit 12. Further, the directional microphone device 1002 includes: a signal addition unit 22; a signal amplification unit 23; a signal subtraction unit 32; a frequency characteristic modification unit 33; a signal delay unit 41; a signal subtraction unit 71; an output terminal 80; and a noise suppression unit 100.

Note that in the following description, it is assumed that on a straight line connecting the first microphone unit 11 and the second microphone unit 12, the first microphone unit 11 side is front, and the second microphone unit 12 side is rear.

The signal delay unit 41 delays an output signal from the first microphone unit 11 and provides the resulting signal.

The signal addition unit 22 adds the output signal from the signal delay unit 41 and the output signal from the second microphone unit 12.

The signal amplification unit 23 attenuates the output signal from the signal addition unit 22 and provides the resulting signal to the signal subtraction unit 71.

The signal subtraction unit 32 performs subtraction on the output signals from the second microphone unit 12 and the signal delay unit 41.

The noise suppression unit 100 suppresses signal amplitude in small amplitude range by nonlinear amplification of the output signal from the signal subtraction unit 32.

The frequency characteristic modification unit 33 modifies the frequency characteristic of the output signal from the noise suppression unit 100 so that rear sensitivity characteristic of the output signal from the signal amplification unit 23 and rear sensitivity characteristic of the output signal from the noise suppression unit 100 are identical to each other, and provides the resulting signal to the signal subtraction unit 71.

The signal subtraction unit 71 performs subtraction on the output signal from the signal amplification unit 23 and the output signal from the frequency characteristic modification unit 33, and provides the resulting signal to the output terminal 80.

The directional microphone device 1002 has the structure as described above.

Next, the operation of the directional microphone device 1002 is described.

The directional microphone device 1002 shown in FIG. 18 differs from the directional microphone device 1001 described in the second embodiment in that the signal delay unit 41 of the present embodiment functions as the first signal delay unit 21 included in the signal-synthesis sensitivity-increase unit 20 and also as the second signal delay unit 31 included in the directivity synthesis unit 30 of the second embodiment. The operation of this part is the same as that of general directivity synthesis, and is the same as described in the second embodiment. Therefore, descriptions of them are omitted.

Further, in the second embodiment, as shown in FIG. 14, the noise suppression unit 100 is provided in the latter stage of the frequency characteristic modification unit 33. In the third embodiment, the order of the noise suppression unit 100 and the frequency characteristic modification unit 33 is opposite, and the frequency characteristic modification unit 33 is provided in the latter stage of the noise suppression unit 100.

By doing so, when the noise suppression unit 100 performs processing using only nonlinear amplification characteristic having less bandwidth division, thermal noise spectral shape from the microphone unit to be suppressed is flattened. Accordingly, the noise suppression unit 100 provides favorable processing results.

Further, by flattening the thermal noise spectral shape by the noise suppression unit 100 which is in the preceding stage of the frequency characteristic modification unit 33, it is possible to improve performance of the frequency characteristic modification unit 33, and reduce the number of bandwidth division, thereby reducing amount of required calculation.

Flattening the noise to be suppressed by the noise suppression unit 100 is advantageous because of the following reason. In the present embodiment, when nonlinear amplification characteristic which does not involve bandwidth division is used for noise suppression, amplitude level at which noise is suppressed becomes identical at entire frequency range; and thus, flattening of noise spectrum of the input signal allows sufficient noise suppression.

Figure 19:
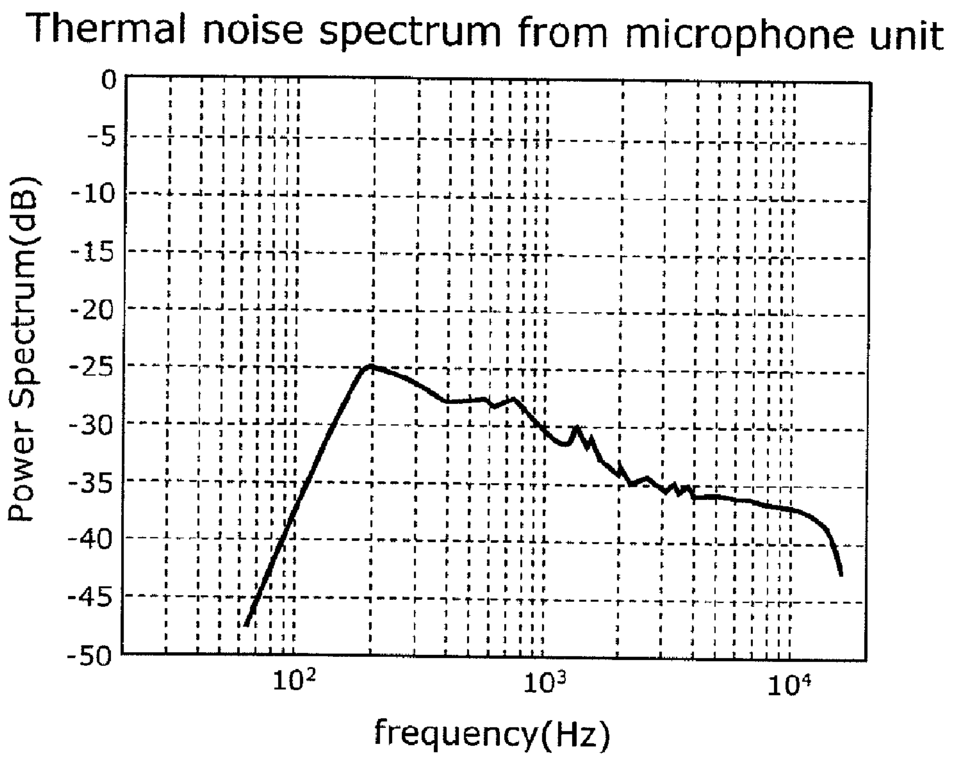
FIG. 19 is a diagram showing a measurement result of thermal noise spectrum from a microphone unit according to the third embodiment of the present invention.
Figure 20:
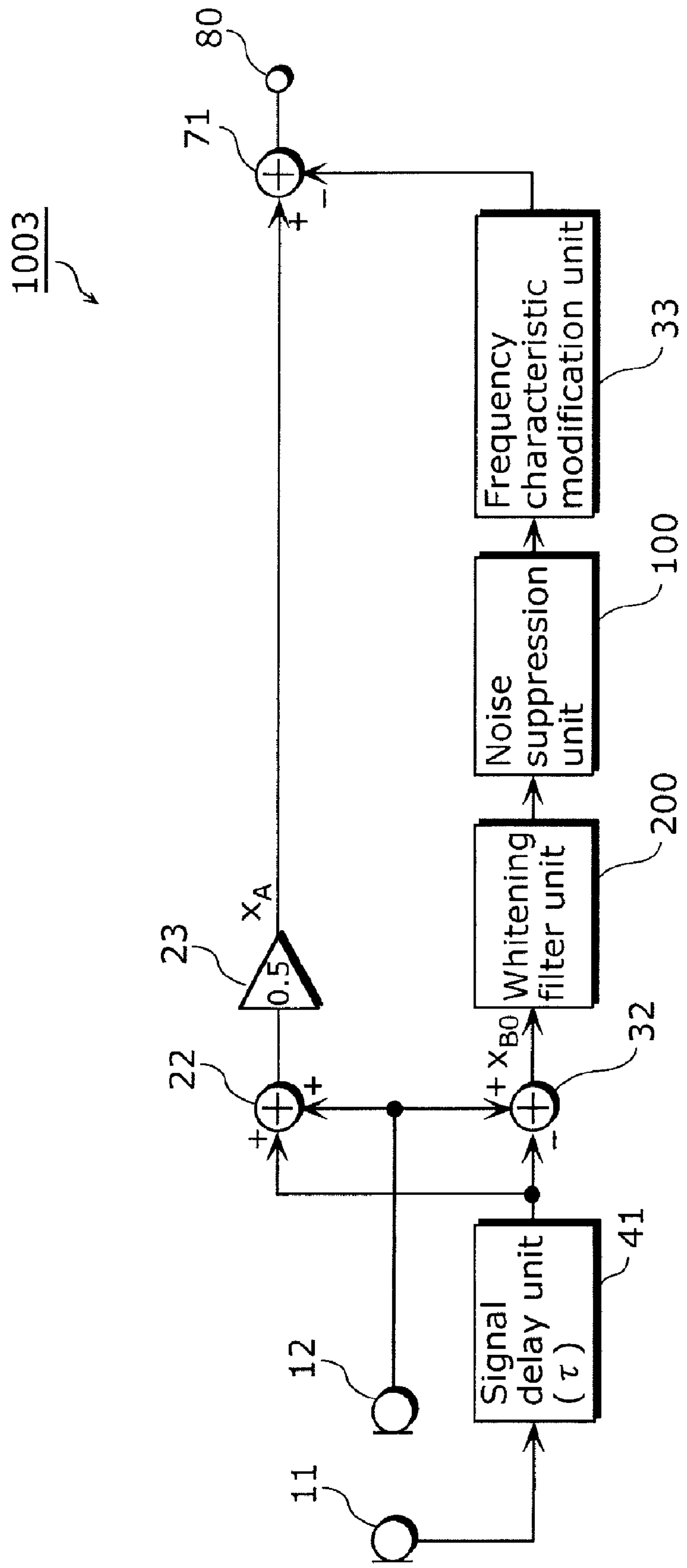
FIG. 20 is a block diagram showing another structure of the directional microphone device 1002 according to the third embodiment of the present invention.

FIG. 19 is a diagram showing a measurement result of thermal noise spectrum from a microphone unit according to the third embodiment of the present invention. FIG. 20 is a block diagram showing another structure of the directional microphone device 1002 according to the third embodiment of the present invention.

The actual thermal noise spectrum of the output signal xB0 from the signal subtraction unit 32 in FIG. 18 is shown in FIG. 19. Therefore, in order to flatten the thermal noise spectrum more precisely, it is preferable, as in the directional microphone device 1003 shown in FIG. 20, to provide a whitening filter unit 200 between the signal subtraction unit 32 and the noise suppression unit 100. Further, it is more preferable that the frequency characteristic modification unit 33 performs modification with inverse characteristic of the whitening filter unit 200.

Fourth Embodiment

Fourth embodiment of the present invention is hereinafter described with reference to FIG. 21 to FIG. 24.

Figure 21:
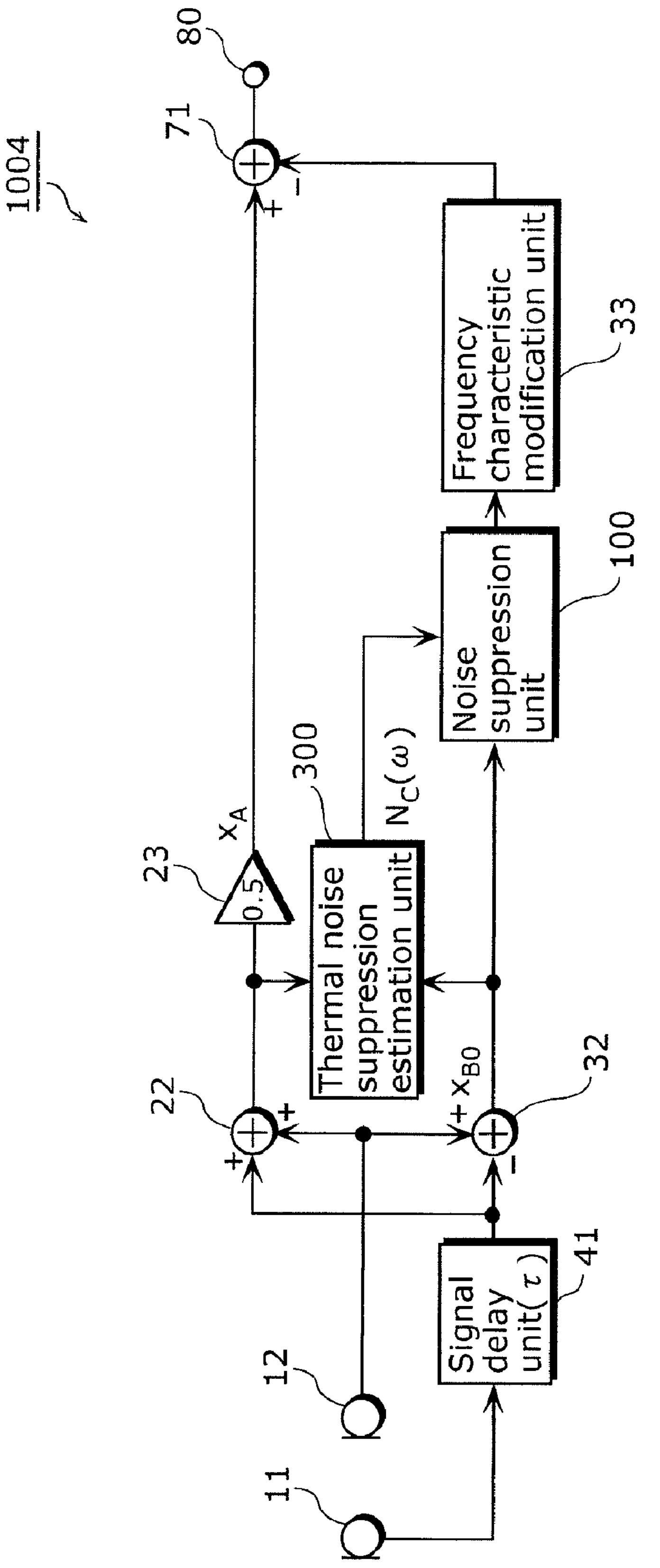
FIG. 21 is a block diagram showing a structure of a directional microphone device 1004 according to fourth embodiment of the present invention.
Figure 22:
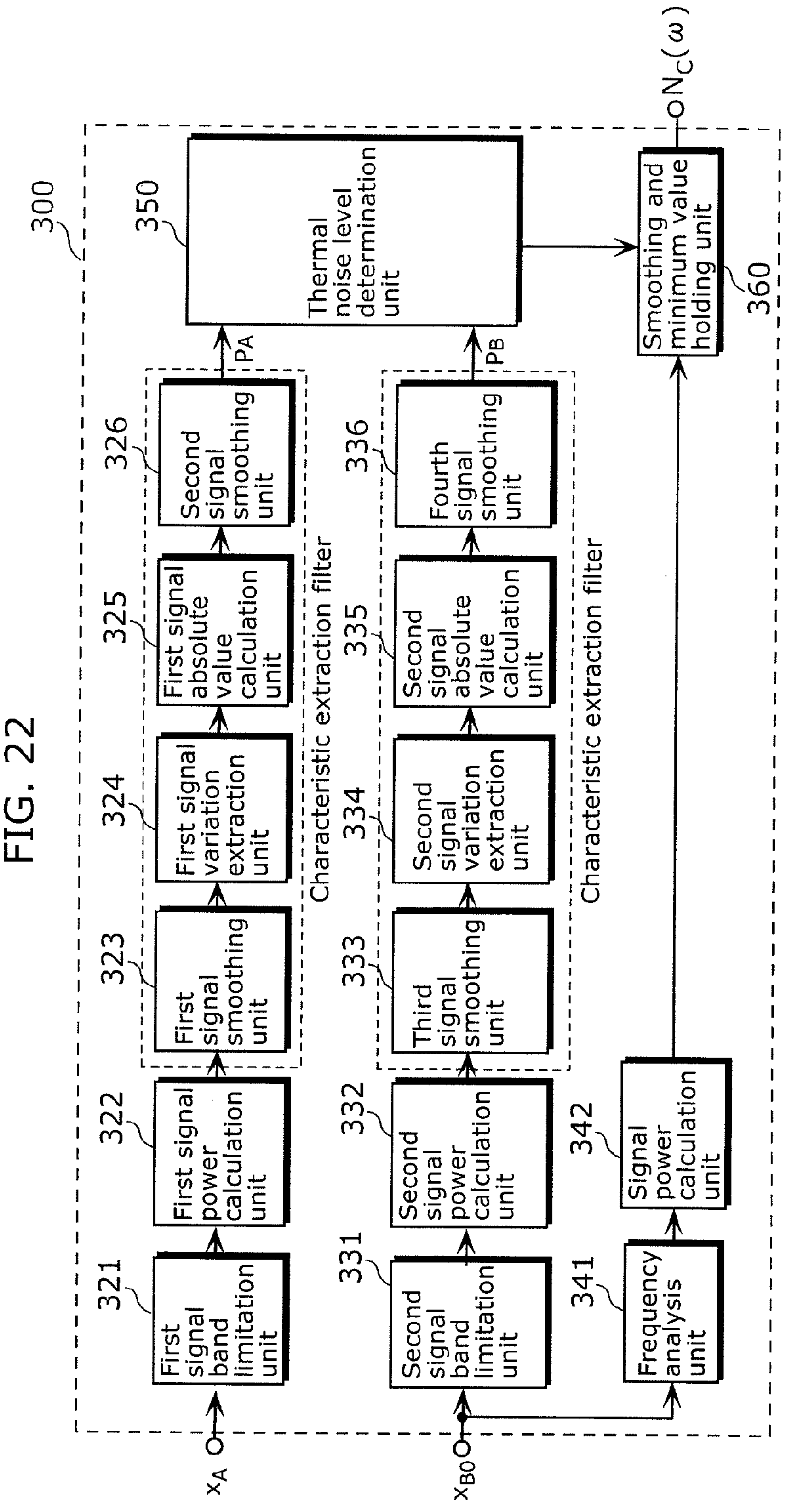
FIG. 22 is a block diagram showing a specific structure of a thermal noise suppression estimation unit 300 in the directional microphone device 1004.
Figure 23:
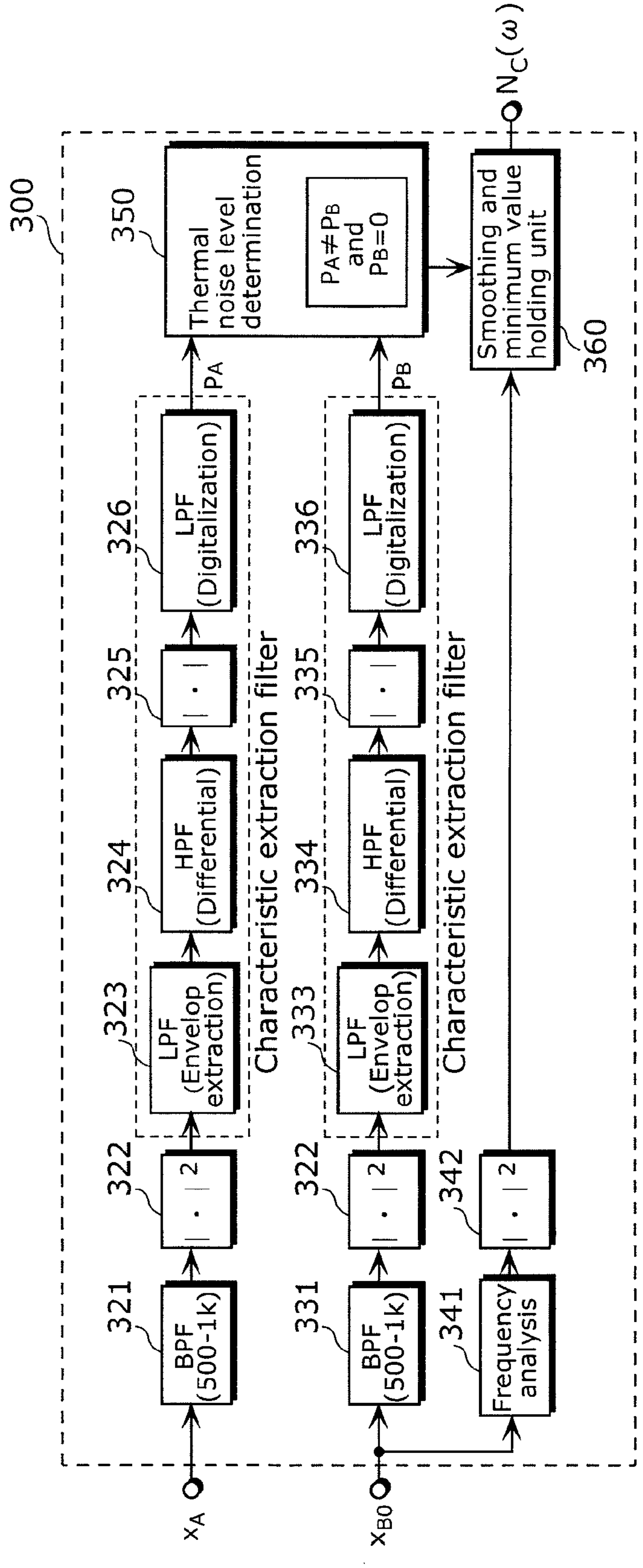
FIG. 23 is a block diagram showing a specific functional structure of the thermal noise suppression estimation unit 300 in the directional microphone device 1004.

FIG. 21 is a block diagram showing a structure of a directional microphone device 1004 according to the fourth embodiment of the present invention. FIG. 22 is a block diagram showing a specific structure of a thermal noise suppression estimation unit 300 included in the directional microphone device 1004. FIG. 23 is a block diagram showing a specific functional structure of the thermal noise suppression estimation unit 300 included in the directional microphone device 1004.

As shown in FIG. 21, the directional microphone device 1004 includes: a first microphone unit 11, a second microphone unit 12, a signal addition unit 22, a signal amplification unit 23, a signal subtraction unit 32, a frequency characteristic modification unit 33, a signal delay unit 41, a signal subtraction unit 71, an output terminal 80, a noise suppression unit 100, and a thermal noise suppression estimation unit 300. Elements which are identical to those appeared in FIG. 18 are assigned with the same referential numerals. The structure and the principle of the operation are identical to those of FIG. 18 of the third embodiment. Therefore, detailed descriptions thereof are omitted.

The directional microphone device 1004 shown in FIG. 21 differs from the directional microphone device 1002 shown in FIG. 18 of third embodiment in that the thermal noise suppression estimation unit 300 is included.

The thermal noise suppression estimation unit 300 receives the output signal from the signal addition unit 22 and the output signal from the signal subtraction unit 32, and estimates the thermal noise level of the signal provided from the signal subtraction unit 32 based on the received output signals. The thermal noise suppression estimation unit 300 provides, to the noise suppression unit 100, information on the estimated thermal noise level of the signal provided from the signal subtraction unit 32.

FIG. 22 shows a specific example of the structure of the thermal noise suppression estimation unit 300 shown in FIG. 21. Here, let the output signal from the signal addition unit 22 be xA, and the output signal from the signal subtraction unit 32 be xB. FIG. 23 shows the specific functional structure of the thermal noise suppression estimation unit 300, which corresponds to the structure shown in FIG. 22.

A first signal band limitation unit 321 receives the output signal xA from the signal addition unit 22, limits band of the received signal, and provides the resulting signal.

A first signal power calculation unit 322 receives the output signal from the first signal band limitation unit 321, squares the received signal, and provides the resulting signal.

A first signal smoothing unit 323 receives the output signal from the first signal power calculation unit 322, smoothes the received signal, and provides the short term average power of the smoothed signal.

A first signal variation extraction unit 324 receives the output signal from the first signal smoothing unit 323, extracts the variation of the received signal level, and provides the resulting signal.

A first signal absolute value calculation unit 325 receives the output signal from the first signal variation extraction unit 324, calculates the absolute value of the received signal, and provides the resulting signal.

A second signal smoothing unit 326 receives the output signal from the first signal absolute value calculation unit 325, smoothes the received signal, and provides the resulting signal.

Accordingly, characteristic is extracted from the variation of the output signal xA from the signal addition unit 22.

A second signal band limitation unit 331 receives the output signal xB from the signal subtraction unit 32, limits band of the received signal, and provides the resulting signal.

A second signal power calculation unit 332 receives the output signal from the second signal band limitation unit 331, squares the received signal, and provides the resulting signal.

A third signal smoothing unit 333 receives the output signal from the second signal power calculation unit 332, smoothes the received signal, and provides the short-term average power of the smoothed signal.

A second signal variation extraction unit 334 receives the output signal from the third signal smoothing unit 333, extracts the variation of the received signal level, and provides the resulting signal.

A second signal absolute value calculation unit 335 receives the output signal from the second signal variation extraction unit 334, calculates the absolute value of the received signal, and provides the resulting signal.

A fourth signal smoothing unit 336 receives the output signal from the second signal absolute value calculation unit 335, calculates the absolute value of the received signal, and provides the resulting signal.

Accordingly, characteristic is extracted from the variation of the output signal xB from the signal subtraction unit 32.

A thermal noise level determination unit 350 receives the output signal from the second signal smoothing unit 326 and the output signal from the fourth signal smoothing unit 336, and determines, based on the two received signals, whether the output signal xB from the signal subtraction unit 32 is at the thermal noise level. The thermal noise level determination unit 350 provides the determination result to a smoothing and minimum value holding unit 360.

A frequency analysis unit 341 receives the output signal xB from the signal subtraction unit 32, analyzes the frequency component of the received signal, and provides signals for each frequency component.

A signal power calculation unit 342 receives the output signal for each frequency component from the frequency analysis unit 341, calculates the power of each frequency component of the received signal, and provides the resulting signal.

Accordingly, the noise level of the output signal xB from the signal subtraction unit 32 is extracted.

The smoothing and minimum value holding unit 360 smoothes the output signal from the signal power calculation unit 342 and holds the minimum value, only when the determination result of the thermal noise level determination unit 350 indicates that the output signal xB is at the thermal noise level. The smoothing and minimum value holding unit 360 provides to the noise suppression unit 100 the thermal noise level Nc (ω) estimated based on the held minimum value.

Accordingly, the thermal noise level determination unit 350 has the structure described above.

Next, the operation of the directional microphone device 1001 according to fourth embodiment is described.

First, characteristics of the output signal xA from the signal addition unit 22 and the output signal xB from the signal subtraction unit 32, which are to be provided to the thermal noise suppression estimation unit 300 in FIG. 21 and FIG. 22 are described.

Here, descriptions are given on the sound wave of the output signals xA and xB. The output signal xA from the signal addition unit 22 is a signal in which output signals from the first microphone unit 11 and the second microphone unit 12 are added. Therefore, the output signal xA exhibits a nearly non-directional directivity at low frequency range for wavelength that is sufficiently longer than the spacing between the microphone units. The sound pressure sensitivity of the output signal xA increases by 6 dB compared to the output signals from each microphone unit.

On the other hand, the output signal xB from the signal subtraction unit 32 is a signal on which directivity synthesis of primary sound-pressure gradient type has been performed on the output signals from the first microphone unit 11 and the second microphone unit 12. Therefore, the output signal xB exhibits a unidirectional characteristic at low frequency range for wavelength that is sufficiently longer than the spacing between the microphone units; however, the sound pressure sensitivity of the output signal xB is attenuated as the frequency becomes lower compared to the output signals from each microphone unit. For example, when the spacing between the microphone units is 10 mm, the sound pressure sensitivity is attenuated by approximately 30 dB at around 100 Hz.

Next, descriptions are given on the thermal noise of the xA and xB. The thermal noise signals of the output signal from the first microphone unit 11 and the output signal from the second microphone unit 12 are uncorrelated and independent of each other.

Thus, in the calculation results of addition and subtraction respectively performed by the signal addition unit 22 and the signal subtraction unit 32, the levels of the thermal noise signals included in the signals equally increase by 3 dB. Note that it is the case where the thermal noise of the first microphone unit 11 is equal to that of the second microphone unit 12.

Accordingly, the characteristics of the signal xA and the signal xB are that the thermal noise levels of both are equal to each other and that the relationship of signal xA>signal xB is established in the sound pressure sensitivity at low frequency range.

Next, in a state where the directional microphone device 1004 is used in a general way, a method for estimating the thermal noise level of the signal xB based on the relationship of the signal xA and the signal xB is described.

When the directional microphone device 1004 is used in an actual environment and the background noise level (ambient noise level) is sufficiently lower than the thermal noise level of the directional microphone device 1004, the thermal noise level of a signal particularly becomes a problem.

Here, such a state is assumed that the background nose level is sufficiently low, and sound wave of the low sound pressure level is arriving at the directional microphone device 1004. Since the sound pressure sensitivity of the signal xA is high, the signal varies by picking up the sound pressure of the sound wave. Whereas, the sound pressure sensitivity of the signal xB is low; and thus, the sound pressure level of the sound wave is buried under the thermal noise level. If variation of the signal level of the signal xA and the signal xB are measured in such a state, time variation of the signal level according to the arriving sound wave is measured for the signal xA, and variation of the signal level is not measured regardless of the arriving sound wave for the signal xB.

Therefore, where the time variation of the signal xA and the signal xB are respectively PA and PB, and when there is time variation in the signal level of the signal xA (where time variation PA>0) and there is no time variation in the signal level of the signal xB (where time variation PB=0), it can be determined that the thermal noise signal is dominant in the signal xB. When this condition is satisfied, the estimated noise level Nc (ω) of the signal xB can be obtained.

FIG. 24 is a diagram showing the relationship of time variation PA and PB of the signal xA and signal xB, respectively.

In FIG. 24, the upper row shows status of signals, that is, sound environment in which the directional microphone is placed, and the lower row shows the relationship of the time variation PA and PB of the signal xA and the signal xB. FIG. 24 shows four patterns (A) to (D) of the relationship of the time variation PA and PB and the ambient sound environment.

In FIG. 24, the column (A) indicates a state that the background noise level is sufficiently low, thermal noise signals are dominant in both of the signal xA and the signal xB, and time variation PA and PB of the signals are both zero. The column (B) in FIG. 24 indicates a state that the background noise level is sufficiently low and the time variation PA and PB of the signals become PA≠PB (where PA>PB, PB=0) when non-stationary sound wave is arriving.

The column (C) in FIG. 24 indicates a state that when the background noise level is high and the ambient noise is stationary, both of the signal xA and the signal xB pick up stationary sound wave that are arriving, but the time variation PA and PB of the signals are both zero. The column (D) in FIG. 24 indicates a state that when the background noise level is high, signal levels of both of the signal xA and the signal xB vary according to the sound wave that are arriving, and the time variation PA and PB of the signals equally vary.

Accordingly, by detecting the state of PA≠PB (where PA>PB, PB=0) which corresponds to the column (B) of FIG. 24, it is possible to distinguish stationary noise signal from thermal noise signal. This allows estimation of the thermal noise level.

FIG. 22 and FIG. 23 are examples of structures for performing the above described operations in the thermal noise suppression estimation unit 300.

In order to obtain the signal variation PA, firstly, the first signal band limitation unit 321 limits the frequency band to be used for determination to mid-low band for the input signal xA, and the first signal power calculation unit 322 converts time waveform of the input signal xA into signal power. Next, the first signal smoothing unit 323 converts the signal power into time envelop of the signal power, and the first signal variation extraction unit 324 extracts variation through time differentiation using a high pass filter or the like. Further, the first signal absolute value calculation unit 325 and the second signal smoothing unit 326 parameterize the variation, output 0 when there is no variation in signal level, and output the signal variation parameter PA whose value increases as the signal level variation becomes greater when there is variation in signal level.

The same processing performed on the input signal xA is performed on the input signal xB as well. The second signal band limitation unit 331, the second signal power calculation unit 332, the third signal smoothing unit 333, the second signal variation extraction unit 334, the second signal absolute value calculation unit 335 and the fourth signal smoothing unit 336 output 0 when there is no variation in signal level, and outputs the signal variation parameter PB whose value increases as the signal level variation becomes greater when there is variation in signal level.

When the condition of PA*PB (where PA>PB, PB=0) is satisfied, as shown in FIG. 23, the thermal noise level determination unit 350 determines that xB indicates the thermal noise signal level based on the signal level time variation PA and the signal level time variation PB.

When determined that the xB indicates the thermal noise signal level, the estimated thermal noise level Nc (ω) is obtained by the frequency analysis unit 341 which analyzes frequency of xB, the signal power calculation unit 342 which calculates the power of each component whose frequency is analyzed, and the smoothing and minimum value holding unit 360 which smoothes the signal power component and holds the minimum value.

Accordingly, the estimated thermal noise level Nc (ω) obtained by the thermal noise suppression estimation unit 300 is used as the thermal noise level Nc (ω) of the noise suppression unit 100. This allows modification in the actual use environment even when the thermal noise level or sensitivity characteristic of the first microphone unit 11 and the second microphone unit 12 vary in manufacturing. As a result, it is possible to improve thermal noise suppression.

As described above, according to the present invention, it is possible to suppress the problem of increase in the thermal noise (problem of decrease in sensitivity) at the time of directivity synthesis, and also to achieve a directional microphone device with high sensitivity.

In a conventional sound-pressure gradient directional microphone, sound pressure sensitivity decreases at low frequency; and thus, thermal noise level relatively increases, which causes a problem that the absolute sensitivity is insufficient in the case where the array size is limited. This imposes limitations on miniaturization of microphone and narrowing directional angle. The present invention is conceived under the consideration that the directivity is provided to the microphone for eliminating sound from the direction other than the direction of target sound, and focused on that the sound to be eliminated is a loud sound which interrupts the target sound. According to the present invention, it is possible to achieve a directional microphone device which obtains directivity while suppressing the increase in the thermal noise by controlling the directivity according to the amplitude range of the signal waveform. More specifically, the directivity is controlled according to the amplitude range of the outputted signal such that small amplitude range which does not require directivity but requires high sensitivity is made to be non-directional and large amplitude range which requires directivity but does not require high sensitivity is made to be directional. This solves the problem of the thermal noise, and allows the directional microphone device which can obtain directivity while maintaining high sensitivity.

(Other Modifications)

Although the present invention has been explained on the basis of the above embodiments and modifications, it should be understood that the present invention is not limited to the above embodiments. The present invention includes the following cases as well.

(1) The above-described processing units (such as the signal-synthesis sensitivity-increase unit 20, the directivity synthesis unit 30) except for the microphone units are implemented as a computer system configured by a microprocessor, a ROM, a RAM, and the like, to be more precise. The RAM stores computer programs.

When the microprocessor operates according to the computer programs, each device achieve their functions. Here, a computer program is structured by a combination of instruction codes showing instructions to be given to a computer in order for a specified function to be achieved.

(2) Some or all of the components included in each of the above-described devices may be constructed by a single system LSI (large scale integration: large scale integrated circuit).

The system LSI is an ultra multi-function LSI manufactured by integrating a plurality of components on a single chip. To be more specific, it is a computer system configured to include a microprocessor, a ROM, a RAM, and the like. The RAM stores computer programs.

When the microprocessor operates according to the computer programs, the system LSI achieves its function.

(3) Some or all of the components included in each of the above-described devices may be constructed by an IC card which can be inserted or removed into or from the device, or by a single module.

The IC card or the module is a computer system configured by a microprocessor, a ROM, a RAM, and the like. The IC card or the module may include the above-mentioned ultra multi-function LSI.

When the microcomputer operates according to the computer programs, the IC card or the module achieves its function. The IC card or the module may have tamper resistance.

(4) The present invention may be the methods described above. Alternatively, the present invention may be a computer program realizing these methods using a computer, or a digital signal structured by the computer program.

Moreover, the present invention as the computer program or the digital signal may be recorded onto a computer-readable record medium, such as a flexible disk, a hard disk, a CD-ROM, an MO, a DVD, DVD-ROM, a DVD-RAM, a BD (Blu-ray Disc), or a semiconductor memory. Or, the present invention may be digital signals stored in these record media.

Furthermore, the present invention may transmit the computer program or the digital signal via a telecommunication line, a wireless or wire communication line, a network typified by the Internet, or a data broadcast.

Also, the present invention may be a computer system including a microprocessor and a memory, the memory storing a computer program and the microprocessor operating according to the computer program. Moreover, by recording the program or the digital signal onto a record medium and then transporting the record medium, or by transporting the program or the digital signal via a network or the like, the present invention may be carried out by a separate standalone computer system.

(5) The present invention may be constructed by a combination of the above-described embodiments and the above-described modifications.

INDUSTRIAL APPLICABILITY

The present invention can be used for a directional microphone device, and particularly, is useful for, for example, a built-in type small directional microphone which suppresses increase in thermal noise which causes a problem in directivity synthesis of sound-pressure gradient type, and obtains directivity while maintaining high sensitivity characteristic. Further, the present invention can also be applied, for example, for distant sound pickup system, such as a hearing aid and a directional microphone for a camcorder, which is ultra directional and requires high sensitivity, and also for a general directional microphone.

The invention claimed is:

1. A directional microphone device comprising:

a plurality of microphones that are different in at least a directivity and a sensitivity characteristic;

a control device configured to generate an output signal using a signal outputted from each of said plurality of microphones; and an output device configured to output the output signal generated by said control device, wherein said control device is configured to generate the output signal such that (i) a nearly non-directional directivity and a high sensitivity are obtained in a small amplitude range where a signal amplitude of the signal outputted from each of said plurality of microphones corresponds to a thermal noise level, and (ii) a directivity and a low sensitivity are obtained in a large amplitude range where the signal amplitude of the signal outputted from each of said plurality of microphones is larger than the thermal noise level.

2. The directional microphone device according to claim 1, wherein said plurality of microphones include a first microphone and a second microphone, said first microphone having sensitivity in a direction of a target sound, said second microphone having a directivity which is less than the directivity of said first microphone and where a minimum sensitivity is oriented to the direction of the target sound, and said control device includes:

a noise suppression device configured to suppress a noise component which is at the thermal noise level and is included in a signal outputted from said second microphone; and a subtraction device configured to generate the output signal by subtracting a signal outputted from said noise suppression device from a signal outputted from said first microphone.

3. The directional microphone device according to claim 2, wherein said noise suppression device is configured to suppress the noise component which is at the thermal noise level according to a nonlinear amplification characteristic in which an amplification factor only in the small amplitude range of the output signal is reduced.

4. The directional microphone device according to claim 2, wherein said noise suppression device is configured to suppress the noise component which is at the thermal noise level (i) by using a method for suppressing stationary noise which is at the thermal noise level, and (ii) according to a nonlinear amplification characteristic in which an amplification factor only in the small amplitude range is reduced.

5. The directional microphone device according to claim 2, further comprising:

a whitening filter device configured to whiten a thermal noise component of the signal outputted from said second microphone, said whitening filter device being positioned between said second microphone and said noise suppression device; and an inverse whitening filter device including an inverse characteristic of said whitening filter device to which the signal outputted from said noise suppression device is inputted, said inverse whitening filter device being positioned between said noise suppression device and said subtraction device.

6. The directional microphone device according to claim 2, wherein each of the signal outputted from said first microphone and the signal outputted from said second microphone is a signal obtained by synthesizing a signal outputted from a first microphone unit and a signal outputted from a second microphone unit, the first microphone unit and the second microphone unit having a same characteristic, the signal outputted from said first microphone is one of the signal outputted from the first microphone unit and the signal outputted from the second microphone unit, or a signal obtained by a synthesis through addition of the signal outputted from said first microphone unit and the signal outputted from said second microphone unit, the synthesis through addition increasing the sensitivity, and the signal outputted from said second microphone is a signal obtained by delaying, among the signal outputted from said first microphone unit and the signal outputted from said second microphone unit, the signal closer to the target sound and by subtracting the delayed signal from the other signal, the obtained signal having the minimum sensitivity in the direction of the target sound.

7. The directional microphone device according to claim 2, further comprising:

a thermal noise estimation device configured to estimate the thermal noise level of the signal outputted from said second microphone, based on a difference in level variation between the signal outputted from said first microphone and the signal outputted from said second microphone, wherein said noise suppression device is configured to suppress the noise component which is at the thermal noise level and is included in the signal outputted from said second microphone, based on the thermal noise level estimated by said thermal noise estimation device.

8. The directional microphone device according to claim 6, wherein the signal outputted from said first microphone unit and the signal outputted from said second microphone unit are divided into frequency ranges for processing.

9. The directional microphone device according to claim 2, wherein said noise suppression device is configured to determine, as a noise suppression frequency range, only a low frequency range where the sensitivity of said second microphone is lower than the sensitivity of said first microphone to the target sound, and to suppress the noise component which is at the thermal noise level for the noise suppression frequency range.

10. A method for controlling a directional microphone, comprising:

generating an output signal using a signal outputted from each of a plurality of microphones that are different in at least a directivity and a sensitivity characteristic; and outputting the output signal generated in said generating, wherein in said generating, the output signal is generated such that (i) a nearly non-directional directivity and a high sensitivity are obtained in a small amplitude range where a signal amplitude of the signal outputted from each of said plurality of microphones corresponds to a thermal noise level, and (ii) a directivity and a low sensitivity are obtained in a large amplitude range where the signal amplitude of the signal outputted from each of said plurality of microphones is larger than the thermal noise level.

11. A non-transitory computer-readable medium having a program stored thereon for controlling a directional microphone device, the program causing a computer to execute a method comprising:

generating an output signal using a signal outputted from each of a plurality of microphones that are different in at least a directivity and a sensitivity characteristic; and outputting the output signal generated in said generating, wherein in said generating, the output signal is generated such that (i) a nearly non-directional directivity and a high sensitivity are obtained in a small amplitude range where a signal amplitude of the signal outputted from each of said plurality of microphones corresponds to a thermal noise level, and (ii) a directivity and a low sensitivity are obtained in a large amplitude range where the signal amplitude of the signal outputted from each of said plurality of microphones is larger than the thermal noise level.

12. An integrated circuit comprising:

a control device configured to generate an output signal using a signal outputted from each of a plurality of microphones that are different in at least a directivity and a sensitivity characteristic; and an output device configured to output the output signal generated in said generating, wherein said control device is configured to generate the output signal such that (i) a nearly non-directional directivity and a high sensitivity are obtained in a small amplitude range where a signal amplitude of the signal outputted from each of said plurality of microphones corresponds to a thermal noise level, and (ii) a directivity and a low sensitivity are obtained in a large amplitude range where the signal amplitude of the signal outputted from each of said plurality of microphones is larger than the thermal noise level.

* * * * *